US009050774B2

(12) United States Patent
Suzuki et al.

(10) Patent No.: US 9,050,774 B2
(45) Date of Patent: Jun. 9, 2015

(54) ANTISTATIC LAMINATE, OPTICAL FILM, POLARIZING PLATE, AND IMAGE DISPLAY DEVICE

(75) Inventors: Masaaki Suzuki, Shizuoka (JP); Hiroyuki Yoneyama, Kanagawa (JP); Katsuyuki Takada, Shizuoka (JP)

(73) Assignee: FUJIFILM CORPORATION, Tokyo (JP)

( * ) Notice: Subject to any disclaimer, the term of this patent is extended or adjusted under 35 U.S.C. 154(b) by 293 days.

(21) Appl. No.: 13/064,974

(22) Filed: Apr. 28, 2011

(65) Prior Publication Data

US 2011/0268935 A1    Nov. 3, 2011

(30) Foreign Application Priority Data

Apr. 30, 2010  (JP) ................ P2010-105923

(51) Int. Cl.
*B32B 33/00* (2006.01)
*B32B 3/10* (2006.01)
*G02B 1/10* (2006.01)

(52) U.S. Cl.
CPC ........... *B32B 3/10* (2013.01); *Y10T 428/24851* (2015.01); *Y10T 428/24802* (2015.01); *B32B 2307/21* (2013.01); *B32B 2307/42* (2013.01); *B32B 2307/536* (2013.01); *B32B 2457/20* (2013.01); *G02B 1/105* (2013.01)

(58) Field of Classification Search
CPC .. B32B 3/10; B32B 2307/21; B32B 2307/42; B32B 2307/536; B32B 2457/20; G01B 1/105; Y10T 428/24802; Y10T 428/24851
See application file for complete search history.

(56) References Cited

U.S. PATENT DOCUMENTS

| 2004/0189907 | A1* | 9/2004 | Tominaga et al. ............ 349/115 |
| 2005/0064198 | A1* | 3/2005 | Takada et al. ............... 428/411.1 |
| 2006/0155096 | A1* | 7/2006 | Matsumoto et al. ............ 528/76 |
| 2008/0118669 | A1 | 5/2008 | Inque et al. |
| 2012/0262785 | A1 | 10/2012 | Inque et al. |

FOREIGN PATENT DOCUMENTS

| JP | 11-035835 | 2/1999 |
| JP | 11-163589 | 6/1999 |
| JP | 11-326602 | 11/1999 |
| JP | 2000256540 A | 9/2000 |
| JP | 2001-131485 | 5/2001 |
| JP | 2001-195919 | 7/2001 |
| JP | 2001-316595 | 11/2001 |
| JP | 2002-003651 | 1/2002 |
| JP | 2002196101 A | 7/2002 |
| JP | 2003041229 A | 2/2003 |
| JP | 2003-261688 | 9/2003 |
| JP | 2004058648 A | 2/2004 |
| JP | 2005-092134 | 4/2005 |
| JP | 2005-114950 | 4/2005 |
| JP | 2005-148444 | 6/2005 |
| JP | 2005-316425 | 11/2005 |
| JP | 2007254730 A | 10/2007 |
| JP | 2007-293325 | 11/2007 |
| JP | 2007-327043 | 12/2007 |
| JP | 2008133407 A | 6/2008 |
| JP | 2008152245 A | 7/2008 |
| JP | 2008-250101 | 10/2008 |
| JP | 2009102467 A | 5/2009 |
| JP | 2010059236 A | 3/2010 |
| WO | WO 2006/040989 A1 | 4/2006 |
| WO | WO 2007/114076 A1 | 10/2007 |

OTHER PUBLICATIONS

Machine Translation of JP 2000-080169.*
Machine Translation of JP 2000-080169. Published Mar. 21, 2000.*
Notification of Reasons for Refusal issued by the Japanese Patent Office (JPO) on Sep. 24, 2013, in connection with JP2010-105923.
Notification with an Information Offer Form issued by the Japanese Patent Office (JPO) on Oct. 8, 2013, in connection with JP2010-105923.

* cited by examiner

*Primary Examiner* — Gerard Higgins
*Assistant Examiner* — Sathavaram I Reddy
(74) *Attorney, Agent, or Firm* — Jean C. Edwards, Esq.; Edwards Neils PLLC

(57) ABSTRACT

A laminate having: a support; and an antistatic layer, wherein the antistatic layer is provided on the support and is made with a composition comprising at least (A) an electrically conductive polymer, and (B) a binder component, the antistatic layer has regions having local concentration of the electrically conductive polymer (A) of 1.5 times or more higher than the average value of the concentration of the electrically conductive polymer (A) in the antistatic layer and the regions are in contact with each other to form a three-dimensional connection structure in the antistatic layer, and a common logarithmic value of the surface resistivity of which unit is $\Omega/sq$ of the antistatic layer is 3.0 or more and 13.0 or less.

11 Claims, No Drawings

ANTISTATIC LAMINATE, OPTICAL FILM, POLARIZING PLATE, AND IMAGE DISPLAY DEVICE

CROSS-REFERENCE TO RELATED APPLICATION(S)

The present application claims priority from Japanese Patent Application No. 2010-105923 filed on Apr. 30, 2010, the entire content of which is incorporated herein by reference.

BACKGROUND

1. Field

The present invention relates to a laminate having high surface hardness and antistatic property, an optical film, a polarizing plate, and an image display device.

2. Description of the Related Art

In various image display devices, such as a liquid crystal display (LCD), a plasma display panel (PDP), an electroluminescence display (ELD), a cathode ray tube (CRT), and SED (Surface-Conduction Electron-Emitter Display), optical films used on the surfaces thereof are required to have antistatic property and high physical strength (e.g., abrasion resistance).

Importance of antistatic property has increased from both aspects of viewpoint of the use in final form of image display devices and viewpoint of the manufacture of image display devices. Dustproof property can be given by providing antistatic property.

As one technique adopted as a method to provide dustproof property, a method of forming what is called an antistatic layer by introducing particles having electric conductivity into an optical film to lower surface resistance is known (refer to JP-A-11-326602 (The term "JP-A" as used herein refers to an "unexamined published Japanese patent application".)). However, particles having electric conductivity generally have a refractive index as high as 1.6 to 2.2 or so, so that the antistatic layer to be formed becomes a high refractive index layer. As a result, optical interference arises when refractive index difference takes place between the antistatic layer and the layer adjacent thereto (an optical film), or between the antistatic layer and the base material contiguous to the antistatic layer, which leads to a problem such that film thickness fluctuation and a minute defect of the antistatic layer are observed as unevenness of the optical film, and the improvement of the problem has been required.

With respect to the problem, an attempt is made to reduce interference unevenness by mixing the interface between the antistatic layer and the contiguous layer thereof. For example, an optical film formed by recoating an antistatic layer and a layer not having the function of antistatic property in the uncured state is disclosed in JP-A-2005-148444. However, since the interface is mixed by diffusing the particles in the antistatic layer, density of the particle lowers and contact probability of the particles is decreased even in such a film. As a result, electric conductivity lowers and there are cases where sufficient dustproof property cannot be obtained. There is a problem that loss in electric conductivity is great particularly when the strength of film is raised by increasing the amount of binder and the thickness of the antistatic layer is thin.

JP-A-2001-131485 discloses that antistatic property, transparency and surface hardness are compatible by arraying secondary particles having a particle size of 0.1 µm in a mesh-like state. However, the method of controlling aggregation of particles is not always sufficient. High aggregating property causes hard spot defect on the surface and cloudiness, in contrast with this, low aggregating property leads to insufficient conductivity. Further, conductive particles are generally high in refractive index, and the increase in refractive index of the film leads to a rise in reflectance and coloring.

Techniques of using an organic antistatic agent in a low refractive index layer containing a binder having alkali resistance are disclosed in JP-A-2005-316425 and JP-A-2007-293325. The use amount of the organic antistatic agent in the low refractive index layer is 0.3 to 5% by mass. The same patents describe that antistatic property can be obtained with the use of a small amount of organic antistatic component. Further, according to the same patents, the concentration of the antistatic agent may take the form of transition in the thickness direction in the low refractive index layer, and a conductive path may be formed such that the organic antistatic component exists in high concentration on the surface of the low refractive index layer. However, antistatic performance is not always sufficient in a cured film in which a small amount of organic antistatic component is localized in the vicinity of the surface, and persistence of it is not also sufficient.

The technique for providing excellent antistatic property without deteriorating various existing performances is an important problem common to the technical field of every sort and kind not limited to the field of optical film alone. Also from the point of manufacturing costs, the development of a technique capable of exhibiting excellent antistatic property with the addition of a small amount of antistatic agent has been eagerly desired.

SUMMARY

An object of the invention is to provide a laminate having excellent antistatic property and superior in productivity. Another object is to provide a laminate having excellent dustproof property, abrasion resistance, adhering property and an optical plane when used as the optical film on the surface of a display.

A further object of the invention is to provide a polarizing plate using the above laminate as optical film. A still further object is to provide an image display device.

As a result of eager examination to solve the above problems, the present inventors have found that these problems can be solved by the following means.

(1) A laminate having: a support; and an antistatic layer, wherein the antistatic layer is provided on the support and is made with a composition comprising at least (A) an electrically conductive polymer, and (B) a binder component, the antistatic layer has regions having local concentration of the electrically conductive polymer (A) of 1.5 times or more higher than the average value of the concentration of the electrically conductive polymer (A) in the antistatic layer and the regions are in contact with each other to form a three-dimensional connection structure in the antistatic layer, and a common logarithmic value of the surface resistivity of which unit is Ω/sq of the antistatic layer is 3.0 or more and 13.0 or less.

(2) A laminate having: a support; and an antistatic layer, wherein the antistatic layer is provided on the support and comprises at least (A) an electrically conductive polymer, and (B) a binder component, the antistatic layer has a sea-island structure containing the electrically conductive polymer (A) in a sea part, and a common logarithmic value of the surface resistivity of which unit is Ω/sq of the antistatic layer is 3.0 or more and 13.0 or less.

(3) The laminate according to (1), wherein at least one component constituting the binder component (B) is a polymer (B1) having a number average molecular weight of 1,500 or more and less than 500,000.
(4) The laminate according to (1), wherein the binder component (B) has a repeating unit having a crosslinking part, and the crosslinking part is at least one selected from the group consisting of a hydroxyl group, a silyl group having a hydrolyzable group, a group having a reactive unsaturated double bond, a ring opening polymerization reactive group, a group having an active hydrogen atom, a group capable of substitution with a nucleophilic agent, and an acid anhydride.
(5) The laminate according to (1), wherein at least one component constituting the binder component (B) is a polymerizable compound (B2) having a molecular weight of 200 or more and less than 1,500.
(6) The laminate according to (1), wherein the binder component (B) has at least one of the compounds (B1) having a number average molecular weight of 1,500 or more and less than 500,000, and at least one of the polymerizable compounds (B2) having a molecular weight of 200 or more and less than 1,500.
(7) The laminate according to (1), wherein the electrically conductive polymer (A) is a π conjugated electrically conductive polymer or the derivative thereof.
(8) The laminate according to (1), wherein the π conjugated electrically conductive polymer is at least one selected from the group consisting of polythiophene, polyaniline, polythiophene derivative and polyaniline derivative.
(9) The laminate according to (1), wherein the electrically conductive polymer (A) is a cationic electrically conductive polymer.
(10). The laminate according to (1), wherein the composition further comprises at least one good solvent of the electrically conductive polymer (A) and at least one good solvent of the binder (B).
(11) An optical film having the laminate according to (1).
(12) A polarizing plate having: a polarizing film; and at least one protective film of the polarizing film, wherein the protective film is the laminate according to (1).
(13) An image display device having the laminate according to (1), the optical film according to (11), or the polarizing plate according to (12).
(14) A laminate having a layer on the upper layer of the antistatic layer of the laminate according to (1), wherein a common logarithmic value of the surface resistivity of which unit is Ω/sq of the outermost layer of the laminate is 3.0 or more and 13.0 or less.

The invention can provide an antistatic laminate excellent in productivity, dustproof property, abrasion resistance, adhering property and an optical plane.

DETAILED DESCRIPTION OF INVENTION

The invention will be described in detail below. In the specification of the invention, when numerical values represent physical values and characteristic values, the description "from numerical value 1 to numerical value 2" means "numerical value 1 or more and numerical value 2 or less". Further, "(meth)acrylate" means "at least either acrylate or methacrylate", and this also applies to "(meth)acrylic acid".

The invention relates to a laminate comprising a base material having provided thereon an antistatic layer formed with a composition containing at least (A) an electrically conductive polymer, and (B) a binder component, wherein the antistatic layer includes regions having local concentration of the electrically conductive polymer (A) of 1.5 times or more higher than the average value of the concentration of the electrically conductive polymer (A) in the antistatic layer and the regions are in contact with each other to form a three-dimensional connection structure in the antistatic layer, and the common logarithmic value (Log SR) of the surface resistivity SR (Ω/sq) of the antistatic layer is 3.0 or more and 13.0 or less.

The invention also relates to a laminate comprising a base material having provided thereon an antistatic layer formed with a composition containing at least (A) an electrically conductive polymer, and (B) a binder component, wherein the antistatic layer has a sea-island structure containing the electrically conductive polymer (A) in a sea part, and the common logarithmic value (Log SR) of the surface resistivity SR(Ω/sq) of the antistatic layer is 3.0 or more and 13.0 or less.

[Antistatic Layer]

The laminate in the invention has an antistatic layer formed with a composition containing at least (A) an electrically conductive polymer, and (B) a binder component The common logarithmic value (Log SR) of the surface resistivity SR (Ω/sq) of the surface of the antistatic layer is 3.0 or more and 13.0 or less. Log SR is preferably 3 or more and 13 or less, more preferably 4 or more and 12 or less, and still more preferably 5 or more and 10 or less. By bringing Log SR into the above range, a laminate having excellent dustproof property can be obtained. The surface resistivity here is the value measured at 25° C. RH 60%.

In the invention, for the compatibility of high film strength and excellent antistatic property, it is necessary for the conductive polymer to have a three dimensional connection structure. A three-dimensional connection structure can be formed by phase separation of a crosslinkable resin composition and a conductive polymer. Phase separation can be caused from a liquid phase containing a crosslinkable resin composition and a solvent in the evaporation process of the solvent called a wet phase separation.

There are two modes of spinodal decomposition and nucleation in the phase separation. The characteristic of phase separation by spinodal decomposition is that a phase separation structure relatively uniform in position is formed, since even density fluctuation occurs all over the system. On the other hand, in phase separation by nucleation, density fluctuation occurs unevenly and a random phase separation structure is formed. Phase separation by spinodal decomposition is preferred for the reason that the phase separation structure to be formed is controlled. In phase separation by spinodal decomposition, the caused density fluctuation forms a co-continuous phase structure with the progress of phase separation, and when phase separation further progresses, the continuous phase is discontinued by its own surface tension and becomes a sea-island structure (a droplet phase structure) having an independent phase such as of a spherical, pure spherical, disc-like, ellipsoidal, or rectangular structure. In such a sea-island structure, by making the concentration of a conductive polymer in the sea part higher than that in the island part, a three dimensional connection structure is formed and high electric conductivity is revealed.

On the other hand, it is also possible to form, according to the degree of phase separation, a three-dimensional connection structure having an intermediate structure between a co-continuous phase structure and a droplet phase structure (a phase structure during the process of transition from the co-continuous phase to the droplet phase). That is, the three-dimensional connection structure in the invention may be a sea-island structure (a droplet phase structure, or a phase structure of one phase being independent or isolated), a co-continuous phase structure (or a network structure), or may be an intermediate structure of the mixture of these structures.

Above all, it is most preferred to have a sea-island structure from the aspect of revelation of electric conductivity.

Further, the antistatic layer in the invention has regions having local concentration of the electrically conductive polymer of 1.5 times or more higher than the whole average value of the concentration of the electrically conductive polymer in the antistatic layer and the regions are in contact with each other to form a three dimensional connection structure in the antistatic layer. The three-dimensional connection structure may be a sea-island structure, a co-continuous phase structure, or may be an intermediate structure of the mixture of these structures as described above, but more excellent electric conductivity is revealed by bringing the local concentration into 1.5 times or more higher than the average value of the concentration of the electrically conductive polymer. The local concentration of a conductive polymer can be measured according to the following TOF-SIMS method and the like by analyzing the cross section of an antistatic layer with an aperture of a diameter of 10 to 50 nm or so, and dividing the entire cross sectional area of the antistatic layer into minute areas with this aperture size. It is possible to compute the relative value of local concentration of a conductive polymer by mapping the signal strength resulting from the conductive polymer all over the area of the cross section of the antistatic layer. By coloring the regions where conductive polymer having local concentration of the electrically conductive polymer of 1.5 times or more higher than the average value of the entire region of the cross section of the antistatic layer is present, thereby it can be judged whether the regions are in contact with each other in the cross section of the antistatic layer.

At this time, two cross sections are formed by drawing two orthogonal straight lines on the surface of the antistatic layer and cutting from each straight line in the normal line direction of the laminate. Not only two-dimensional connection of the conductive polymer on the cut surface but also the presence of three-dimensional connection can be judged by observing the two cross sections. When the thickness of the antistatic layer is thin, i.e., several times or so the aperture, cut area can be made large by making the angle to cut the laminate shallow from the normal line direction (90°) (1° to less than 90°), and resolution of mapping in the antistatic layer can be raised.

A three-dimensional connection structure formed by electrically conductive polymer molecules can be measured according to, e.g., the following method.

In the first place, a laminate is obliquely cut with a microtome at an angle of 1° to 90°, and the obtained cut cross section of the layer is analyzed by TOF-SIMS method. The local concentration of the conductive polymer in the layer can be evaluated by ion imaging of TOF-SIMS method and the presence of three-dimensional connection structure can be confirmed.

Incidentally, TOF-SIMS method is the abbreviation of [Time-of-Flight Secondary Ion Mass Spectrometry], and is a method capable of measuring the image of ions reflecting the structure of an organic compound present on the surface of a solid sample by measuring the secondary ions such as molecular ions and fragment ions emitted from the molecules in the sample by irradiation with primary ions such as $Ga^+$ or $In^+$.

Detection of secondary ions by TOF-SIMS method is possible in both of cations and anions, but cations are selected in the embodiment of the invention. In the same area of cut cross section of an image-recording layer, the images of all secondary ions having mass of 0 to 1,000 amu (amu: atom mass unit) can be measured by Raw Data system. Incidentally, for the neutralization of charge up of the surface of a sample during measurement, an electron flood gun can be used.

It is essential for a region where the local concentration of the electrically conductive polymer is 1.5 times or more higher than the average value of the entire layer to have a three-dimensional connection structure, but a region where the local concentration of the electrically conductive polymer is less than 1.5 times the average value of the entire layer may form a continuous phase or a discontinuous phase. When a discontinuous phase is formed, in a sea-island-like phase separation structure, by making the concentration of the electrically conductive polymer higher in the sea part than in the island part, a good conductive path is formed and excellent conductivity reveals even with a small addition amount of the conductive polymer. It becomes possible to lessen the content of a conductive component and the compatibility of high film strength and excellent antistatic property can be realized by effectively forming a conductive path in this manner. In addition to the above three-dimensional connection structure, segregation parts of a conductive polymer are present at the lower or upper part of an antistatic layer, and a two-dimensional connection may be formed on the underside or topside.

In the invention, the local concentration of the conductive polymer has a heterogeneous structure in the antistatic layer, but the size of a short region in the region where local concentration of the conductive polymer is less than 1.5 times the average of the entire layer is preferably in the range of 5 to 2,000 nm from the relationship between film strength and appearance. The size of a short region means the average value of the lengths of the shorter regions (for example, the island structure is a short region when the separation structure is a sea-island structure, and a particle is a short region in the case of particle dispersion) in the measured line length of every region at the time of recording a minute structure of an antistatic layer as an image with oblique cutting TOF-SIMS, SEM, TEM or a laser microscope, and drawing an arbitrary additional line thereto.

When the size of the short region is 5 nm or more, electric conductivity and adhering property are liable to be compatible and so preferred. On the other hand, when the size of the short region is 2,000 nm or less, scattering by means of interface in every region is a negligible level. As a result, the laminate is free from cloudiness and so preferred. From such a viewpoint, the size of the short region is preferably 5 to 2,000 nm, more preferably 10 to 1,000 nm, and still more preferably 30 to 200 nm.

Further, when it is desired to positively give light scattering property to an antistatic layer by forming in-layer phase separation structure in the antistatic layer, the short region size of the island structure is preferably 0.2 to 10 μm, and more preferably 0.5 to 8 μm.

[Three-dimensional Connection Structure of Electrically Conductive Polymer]

For advancing the formation of a three-dimensional connection structure (an electrically conductive network structure) of the electrically conductive polymer in an antistatic layer to heighten electric conductivity, it is important to appropriately control the compatibility of the conductive polymer and a binder component. When the compatibility of a conductive polymer and a binder component is high, the conductive polymer is averagely distributed and contact frequency among the conductive polymer decreases to thereby cause loss in electric conductivity. On the other hand, when the compatibility is too low, various problems arise such as cloudiness of a coated film, dissolution failure of a coating solution and coating repellency failure. In the invention, the above problem can be solved by controlling the compatibility of a conductive polymer and a binder component and forming a three-dimensional connection structure.

For forming an electrically conductive network of a conductive polymer, it is important to properly select conductive polymers, binders and solvents.

(A) Electrically conductive polymers, (B) binders, and solvents for use in the laminate of the invention, and constituents other than these components that can be used in the antistatic layer will be described below.

[(A) Electrically Conductive Polymers]

Since electrically conductive polymers (A) are high molecular weight compounds, surface failures of a film by bleeding out to the surface of the film are few.

As the examples of electrically conductive polymers (A), ionic electrically conductive polymers and π conjugated electrically conductive polymers are exemplified.

(Ionic Electrically Conductive Polymers)

As the ionic electrically conductive polymers, ionene type polymers having a dissociative group in the main chain and cationic polymeric compounds are exemplified.

As the ionic electrically conductive polymers, ionene type polymers having a dissociative group in the main chain as described in JP-B-49-23828 (the term "JP-B" as used herein refers to an "examined Japanese patent publication"), JP-B-49-23827, JP-B-47-28937, JP-B-55-734, JP-A-50-54672, JP-A-59-14735, JP-A-57-18175, JP-A-57-18176, and JP-A-57-56059; and cationic polymeric compounds as described in JP-B-53-13223, JP-B-57-15376, JP-B-53-45231, JP-B-55-145783, JP-B-55-65950, JP-B-55-67746, JP-B-57-11342, JP-B-57-19735, JP-B-58-56858, JP-A-61-27853, JP-A-62-9346, JP-A-10-279833, and JP-A-2000-80169 can be exemplified.

Above all, especially preferred ionic electrically conductive polymers are polymer type quaternary ammonium salts containing a quaternary ammonium cation. By using polymer type quaternary ammonium salts as the organic electrically conductive polymeric compound, a laminate excellent in coated surface and adhesion can be obtained.

The content of ionic electrically conductive polymeric compound in the composition for forming an antistatic layer is preferably 6% to 70% by mass to all the solids content, more preferably 6% to 50% by mass, and most preferably 10% to 40% by mass. When the content of the ionic electrically conductive polymeric compound is 6% by mass or more, sufficient electric conductivity can be obtained, and when the content is 70% by mass or less, deterioration of adhesion and coated surface hardly occurs.

(π Conjugated Electrically Conductive Polymers)

π Conjugated electrically conductive polymers are not especially restricted so long as they are organic polymers the main chain of which is composed of π conjugated system. The π conjugated electrically conductive polymers are preferably π conjugated heterocyclic compounds or derivatives thereof for the reason of compound stability and high electric conductivity.

As the π conjugated electrically conductive polymers, at least one selected from the group consisting of aliphatic conjugated polyacetylene, polyacene, polyazulene, aromatic conjugated polyphenylene, heterocyclic conjugated polypyrrole, polythiophene, polyisothianaphthene, hetero atom-containing conjugated polyaniline, polythienylenevinylene, mixed type conjugated poly(phenylenevinylene), multi-chain type conjugated system which is conjugated system having a plurality of conjugate chains in the molecule, derivatives of these electrically conductive polymers, and electrically conductive composites which are polymers obtained by graft or block copolymerization of these conjugate polymer chains with saturated polymers can be exemplified.

From the aspect of stability in the air, polypyrrole, polythiophene, polyaniline and derivatives of them are preferred, and polythiophene, polyaniline, and derivatives of them (i.e., polythiophene, polyaniline, polythiophene derivatives, and polyaniline derivatives) are more preferred.

Sufficient electric conductivity and compatibility with a binder resin can be obtained even with unsubstituted π conjugated electrically conductive polymers as they are, but for further increasing electric conductivity and compatibility, it is preferred to introduce a functional group such as an alkyl group, a carboxyl group, a sulfo group, an alkoxy group, a hydroxyl group or the like into the π conjugated electrically conductive polymers.

The specific examples of the π conjugated electrically conductive polymers include, as polypyrroles: polypyrrole, poly(N-methylpyrrole), poly(3-methylpyrrole), poly(3-ethylpyrrole), poly(3-n-propylpyrrole), poly(3-butylpyrrole), poly(3-octyl-pyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), and poly(3-methyl-4-hexyloxypyrrole), as polythiophenes: poly(thiophene), poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3-methyl-4-methoxythiophene), poly(3,4-ethylenedioxythiophene), poly(3-methyl-4-ethoxythiophene), poly(3-carboxy-thiophene), poly(3-methyl-4-carboxythiophene), poly(3-methyl-4-carboxyethyl-thiophene), and poly(3-methyl-4-carboxybutylthiophene), as polyanilines: polyaniline, poly(2-methylaniline), poly(3-isobutylaniline), poly(2-anilinesulfonic acid), and poly(3-anilinesulfonic acid).

(Polymer Dopants Having an Anionic Group)

The π conjugated electrically conductive polymers are preferably used with a polymer dopant having an anionic group (also referred to as "a polyanion dopant"). By combining a polymer dopant having an anionic group with the π conjugated electrically conductive polymer in use, electric conductivity, aging stability of electric conductivity, and water resisting property in a laminate state are improved.

As the examples of the polyanion dopants, e.g., polymer having at least any structure of substituted or unsubstituted polyalkylene, substituted or unsubstituted polyalkenylene, substituted or unsubstituted polyimide, substituted or unsubstituted polyamide, and substituted or unsubstituted polyester, and containing a structural unit having an anionic group are exemplified.

The polyalkylene is a polymer the main chain of which is composed of a methylene repeating unit. The examples of the polyalkylenes include polyethylene, polypropylene, polybutene, polypentene, polyhexene, polyvinyl alcohol, polyvinyl phenol, poly(3,3,3-trifluoropropylene), polyacrylonitrile, polyacrylate and polystyrene.

The polyalkenylene is a polymer composed of a repeating unit containing an unsaturated double bond (a vinyl group) in the main chain.

The examples of the polyimides include polyimides includes acid anhydride such as pyromellitic acid dianhydride, biphenyltetracarboxylic acid dianhydride, benzophenonetetracarboxylic acid dianhydride, or 2,2'-[4,4'-di-(dicarboxyphenyloxy)phenyl]propane dianhydride, and diamine such as oxydiamine, paraphenylenediamine, metaphenylenediamine, or benzophenonediamine.

The examples of the polyamides include polyamide 6, polyamide 6,6 and polyamide 6,10 and so on.

The examples of the polyesters include polyethylene terephthalate and polybutylene terephthalate and so on.

As the examples of the substituents of the polyanion dopant, an alkyl group, a hydroxyl group, an amino group, a carboxyl group, a cyano group, a phenyl group, a hydroxyphenyl group, an ester group and an alkoxy group are exemplified. Considering solubility in an organic solvent, heat resisting property, and compatibility with a binder resin, an alkyl group, a hydroxyl group, a hydroxyphenyl group and an ester group are preferred.

As the alkyl groups, chain (straight chain or branched chain) alkyl groups such as methyl, ethyl, propyl, butyl, isobutyl, t-butyl, pentyl, hexyl, octyl, decyl and dodecyl, and cycloalkyl groups such as cyclopropyl, cyclopentyl and cyclohexyl are exemplified.

As the hydroxyl groups, hydroxyl groups bonded to the main chain of the polyanion dopant directly or via other functional group are exemplified. The examples of other functional groups include an alkyl group having 1 to 7 carbon atoms, an alkenyl group having 2 to 7 carbon atoms, an amido group and an imido group. The hydroxyl groups are substituted at terminals of the functional groups or in the functional groups.

As the amino groups, amino groups bonded to the main chain of the polyanion dopant directly or via other functional group are exemplified. The examples of other functional groups include an alkyl group having 1 to 7 carbon atoms, an alkenyl group having 2 to 7 carbon atoms, an amido group and an imido group. The amino groups are substituted at terminals of the functional groups or in the functional groups.

As the hydroxyphenyl groups, hydroxyphenyl groups bonded to the main chain of the polyanion dopant directly or via other functional group are exemplified. The examples of other functional groups include an alkyl group having 1 to 7 carbon atoms, an alkenyl group having 2 to 7 carbon atoms, an amido group and an imido group. The hydroxyphenyl groups are substituted at terminals of the functional groups or in the functional groups.

The examples of the anionic groups of the polyanion dopant include $-O-SO_3-X^+$, $-SO_3-X^+$, $-COO-X^+$ (wherein $X^+$ represents a hydrogen ion or an alkali metal ion).

Of these anionic groups, $-SO_3-X^+$ and $-COO-X^+$ are preferred for the doping performance to π conjugated electrically conductive polymers.

Of the above polyanion dopants, polyisoprenesulfonic acid, copolymers containing polyisoprenesulfonic acid, polysulfoethyl methacrylate, copolymers containing polysulfoethyl methacrylate, poly(4-sulfobutyl methacrylate), copolymers containing poly(4-sulfobutyl methacrylate), polymethallyloxybenzenesulfonic acid, copolymers containing polymethallyloxybenzenesulfonic acid, polystyrenesulfonic acid, and copolymers containing polystyrenesulfonic acid are preferred from the point of solubility in a solvent and conductivity.

The range of monomer units of 10 to 100,000 is preferred for the degree of polymerization of the polyanion dopant, and the range of 50 to 10,000 is more preferred in view of solubility in a solvent and conductivity.

The content of the polyanion dopant is preferably in the range of 0.1 mols to 10 mols per mol of the π conjugated electrically conductive polymer, and more preferably in the range of 1 mol to 7 mols. The mol number here is defined by the number of the structural unit deriving from the monomer containing the anionic group forming the polyanion dopant, and the number of the structural unit deriving from the monomer such as pyrrole, thiophene or aniline forming the π conjugated electrically conductive polymer. When the content of the polyanion dopant is 0.1 mols or more per mol of the π conjugated electrically conductive polymer, doping effect to the π conjugated electrically conductive polymer becomes high and sufficient conductivity is exhibited. In addition, dispersibility and solubility in a solvent of the π conjugated electrically conductive polymer becomes high and homogeneous dispersion can be easily obtained. Further, when the content of the polyanion dopant is 10 mols or less per mol of the π conjugated electrically conductive polymer, a large amount of the π conjugated electrically conductive polymer can be contained, and so sufficient conductivity can be easily obtained.

The content in total of the π conjugated electrically conductive polymer and the polyanion dopant in the composition for forming an antistatic layer is preferably 6% to 70% by mass to the entire solids content, more preferably 6% to 50% by mass, and most preferably 10% to 40% by mass. When the content in total of the π conjugated electrically conductive polymer and the polyanion dopant is 6% by mass or more, sufficient conductivity is obtained, and when it is 70% by mass or less, deterioration of adhesion and coated surface is difficult to occur.

(Solubility in Organic Solvent)

The conductive polymers are preferably soluble in an organic solvent for giving coating property.

More specifically, the conductive polymers are preferably soluble at least in concentration of 1.0% by mass in an organic solvent having a water content of 5% by mass or less and dielectric constant of 2 to 30.

Here, "soluble" means that the polymer is dissolved in the solvent in a single molecular state, or dissolved in a state such that a plurality of single molecules are associated, or the polymer is dispersed in a particulate state of a particle size of 300 nm or less.

In general, conductive polymers are high in hydrophilicity and dissolved in solvents containing water as the main component. To make such a conductive polymer soluble in an organic solvent, methods of adding a compound for heightening the affinity of the conductive polymer with the organic solvent to a composition containing the conductive polymer, or a dispersant in the organic solvent are exemplified. Further, when a conductive polymer and a polyanion dopant are used, it is preferred that the polyanion dopant is subjected to hydrophobilization treatment, as described later.

Further, as a method that can be used, solubility in an organic solvent of a conductive polymer is increased in advance by de-doping the conductive polymer, and a dopant is added after forming a film to thereby reveal conductivity.

Besides the above, to improve the solubility of the conductive polymers in an organic solvent, the methods described in the following documents are preferably used.

For example, JP-A-2002-179911 discloses a method of dissolving a polyaniline composition in an organic solvent in a de-doping state in advance, coating the composition on a base material and drying, and then carrying out oxidation and doping treatment with a solution obtained by dissolving or dispersing a protonic acid and an oxidant to thereby reveal conductivity.

Further, WO 05/035626 discloses a method of manufacturing a conductive polyaniline capable of stably dispersing in an organic solvent by the coexistence of a molecular weight adjustor and, if necessary, a layer-to-layer moving catalyst in oxidation polymerization of aniline or derivative thereof in a mixed layer including an aqueous layer and an organic layer under the presence of at least one kind of a sulfonic acid and water-insoluble organic polymer compound having a protonic acid group.

As the organic solvents, e.g., alcohols, aromatic hydrocarbons, ethers, ketones and esters are preferably used. Specific compounds are exemplified below (dielectric constants are shown in the parentheses).

The alcohols include monovalent alcohols and divalent alcohols. As the monovalent alcohols, saturated aliphatic alcohols having 2 to 8 carbon atoms are preferred. As the specific examples of these alcohols, ethyl alcohol (25.7), n-propyl alcohol (21.8), i-propyl alcohol (18.6), n-butyl alcohol (17.1), sec-butyl alcohol (15.5), and tert-butyl alcohol (11.4) can be exemplified.

As the specific examples of aromatic hydrocarbons, benzene (2.3), toluene (2.2), and xylene (2.2), as the specific examples of ethers, tetrahydrofuran (7.5), ethylene glycol monomethyl ether (16), ethylene glycol monomethyl ether acetate (8), ethylene glycol monoethyl ether (14), ethylene glycol monoethyl ether acetate (8), and ethylene glycol monobutyl ether (9), as the specific examples of ketones, acetone (21.5), diethyl ketone (17.0), methyl ethyl ketone (15.5), diacetone alcohol (18.2), methyl isobutyl ketone (13.1), and cyclohexanone (18.3), and as the specific examples of esters, methyl acetate (7.0), ethyl acetate (6.0), propyl acetate (5.7), and butyl acetate (5.0) can be respectively exemplified.

In the invention, dielectric constant is a value measured at 20° C.

In the invention, it is preferred to use two or more organic solvents having a dielectric constant of 2 to 30 as mixture. This is presumed for the reason that by mixing the good solvent of conductive polymer (A) and the good solvent of binder (B), a three-dimensional connection structure of both is liable to be formed during the process of evaporation of the solvents. Organic solvent having a dielectric constant exceeding 30 or water in concentration of 5% by mass or less can also be used in combination, but in mixed organic solvents including the above organic solvents, it is preferred that the dielectric constant of mass average of two or more organic solvents and water does not exceed 30.

In the invention, the electrically conductive polymers are those soluble in an organic solvent in concentration of at least 1.0% by mass.

The conductive polymers may exist in the organic solvents in a particulate state. In this case, the average particle size is preferably 300 nm or less, more preferably 200 nm or less, and still more preferably 100 nm or less. By the above particle size, precipitation in the organic solvent can be restrained. The greatest lower bound of particle size is not especially restricted.

For elimination of coarse particles and acceleration of dissolution, a high pressure disperser can be used. The examples of high pressure dispersers include Gaulin (manufactured by APV Gaulin), Nanomizer (manufactured by Nanomizer Inc.), Microfluidizer (manufactured by Microfluidics), Altimizer (manufactured by Sugino Machine Limited), and DeBee (manufactured by Bee Co., Ltd.). By scooping an organic solvent solution on the grid for observation of an electron microscope, particle sizes can be observed after volatilization of the solvent. Precipitation in the organic solvent is restrained with the above particle size and polymers having such a size can be introduced into the coating composition for forming the laminate in the invention.

As described above, when a polyanion dopant is used with the conductive polymer, the composition containing the conductive polymer and polyanion dopant is preferably subjected to hydrophobitization treatment. By the hydrophobitization treatment of the composition, solubility of the conductive polymer in an organic solvent is raised and compatibility with binder component (B) can be properly improved. The hydrophobitization treatment can be done by modifying the anionic groups of the polyanion dopant.

As the first method of hydrophobitization treatment, a method of esterification, etherification, acetylation, tosylation, tritylation, alkylsilylation or alkylcarbonylation of the anionic groups is specifically exemplified. Of these methods, esterification and etherification are preferred. As hydrophobitization method by esterification, a method of chlorinating the anionic groups of the polyanion dopant with a chlorinating agent and then esterifying with alcohols such as methanol and ethanol is exemplified. Further, it is also possible to perform hydrophobitization by esterification with a sulfo group and a carboxyl group by using a compound having a hydroxyl group or a glycidyl group and further having an unsaturated double bond.

Conventionally known various methods can be used in the invention, for example, the methods specifically described in JP-A-2005-314671 and JP-A-2006-28439 can be used.

As the second method of hydrophobitization treatment, a method of hydrophobilization by attaching a basic compound to the anionic groups of a polyanion dopant is exemplified. As the basic compounds, amine compounds are preferred, e.g., primary amines, secondary amines, tertiary amines and aromatic amines are exemplified. Specifically, primary to tertiary amines substituted with an alkyl group having 1 to 20 carbon atoms and imidazole and pyridine substituted with an alkyl group having 1 to 20 carbon atoms are exemplified. For the improvement of solubility in an organic solvent, the molecular weight of amines is preferably 50 to 2,000, more preferably 70 to 1,000, and most preferably 80 to 500.

The amount of the amine compound that is a basic hydrophobilizing agent is preferably 0.1 to 10.0 mol equivalent to the anionic group of the polyanion dopant not contributing to doping of the electrically conductive polymer, more preferably 0.5 to 2.0 mol equivalent, and especially preferably 0.85 to 1.25 mol equivalent. In the above range of the amine compound, solubility in an organic solvent, electric conductivity and film strength can be satisfied.

Other details concerning the hydrophobitization treatment as disclosed in JP-A-2008-115215 and JP-A-2008-115216 are applicable to the invention.

(Solubilizing Agent)

The conductive polymers can be used together with a compound containing a hydrophilic part, a hydrophobic part, and preferably a part having an ionizing radiation crosslinking functional group (hereinafter referred to as "a solubilizing agent").

The use of the solubilizing agent not only assists solubilization of the conductive polymers in an organic solvent having a low water content, but also improves the coated surface state of the antistatic layer of the invention, formation of a three-dimensional connection structure, and strength of the crosslinked film.

The solubilizing agent are preferably copolymers having a hydrophilic part, a hydrophobic part, and a part containing an ionizing radiation crosslinking functional group, and especially preferably block type or graft type copolymers in which these parts are segmented. Such copolymers can be polymerized by living anionic polymerization, living radical polymerization, or with macromonomers having these parts.

Solubilizing agent are described, for example, in JP-A-2006-176681, paragraphs (Low Molecular Weight Dopants)

In the invention, it is also preferred to use low molecular weight dopants in addition to the polyanion dopants. As the low molecular weight dopants, compounds having two or less anionic groups in one molecule and a molecular weight of 1,000 or less are preferred. Of these compounds, it is preferred to use one or more compounds selected from the group consisting of 2-acrylamido-2-methyl-1-propanesulfonic acid, 1,1-oxybistetrapropylene derivative, sodium benzenesulfonate, and vinylallylsulfonic acid. The amount of these low molecular weight dopants is preferably 0.01% to 5% by mol per mol of the π conjugated electrically conductive polymer, and more preferably 0.1% to 3% by mol.

(Preparation Method of Solutions Containing an Electrically Conductive Polymer)

Electrically conductive polymers can be prepared in the form of a solution with the above organic solvents.

The solution of conductive polymers can be prepared by several methods, and the following three methods are preferably used.

The first method is a method of polymerizing a conductive polymer in water in the coexistence of a polyanion dopant, after that, if necessary, treating the polymer by adding the solubilizing agent or the basic hydrophobilizing agent, and then replacing the water with an organic solvent. The second method is a method of polymerizing a conductive polymer in water in the coexistence of a polyanion dopant, after that, if necessary, treating the polymer with the solubilizing agent or the basic hydrophobilizing agent, followed by evaporating the water to dryness, and then adding an organic solvent for solubilization. The third method is a method of, after preparing an electrically conductive polymer and a polyanion dopant separately, mixing and dispersing both in a solvent to prepare an electrically conductive polymer composition in a dope state, and in the case where water is contained in the solvent, replacing the water with an organic solvent.

In the above methods, the use amount of the solubilizing agent is preferably 1% to 100% by mass to the total amount of the conductive polymer and polyanion dopant, more preferably 2% to 70% by mass, and most preferably 5% to 50% by mass. The method of replacing the water with the organic solvent in the first method is preferably a method of adding a solvent highly miscible with water such as ethanol, isopropyl alcohol or acetone to make the solution homogeneous, and then removing the water by ultrafiltration. Further, a method of adjusting the composition of the solution by mixing a more hydrophobic solvent to remove the component having high volatility under reduced pressure after lowering the water content to a certain degree with a highly water-miscible solvent is exemplified. If sufficient hydrophobitization is performed with a basic hydrophobiting agent, it is also possible to add an organic solvent low miscible with water to the conductive polymer solution to make a separated two-phase system and extract the electrically conductive polymer in the water phase to the organic solvent phase.

[(B) Binder Components]

The antistatic layer of the laminate in the invention is formed with the composition containing (A) the electrically conductive polymer and (B) at least one binder component.

As the binder component (B), the first preferred embodiment is to contain at least a compound having a number average molecular weight of 1,500 or more and less than 500,000 (binder component (B1)). This is for the purpose of easily forming the state of a sea-island structure to thereby easily form a three-dimensional connection structure of the conductive polymer by using high molecular weight binder component (B1) having low affinity with the conductive polymer. Electrically conductive polymer (A) and binder component (B1) are not phase-separated in the coating composition, but it is preferred that electrically conductive polymer and the binder are phase-separated during the process of evaporation of the solvent after application of the coating solution on a support.

The number average molecular weight of 1,500 or more of binder component (B1) is preferred for forming the phase separation structure with the conductive polymer. The number average molecular weight of less than 500,000 is preferred for securing solubility in a solvent. The number average molecular weight of binder component (B1) is more preferably 3,000 or more and less than 300,000.

Of the binder components, it is preferred for the compound having a number average molecular weight of 1,500 or more and less than 500,000 to form the sea part in the sea-island structure of the antistatic layer, by which the conductive polymer is present in high concentration in the sea part, and so electric conductivity can be secured and high hardness can be maintained by the binder in the sea part.

Here, the number average molecular weight (Mn) is a molecular weight detected with a GPC analyzer using columns of TSKgel GMHxL, TSKgel G4000HxL, and TSKgel G2000HxL (trade names, manufactured by TOSO CORPORATION), a solvent THF, and a differential refractometer, and expressed in terms of polystyrene.

The preferred addition amount of binder component (B1) is 1% to 60% by mass in the solids content in the composition for forming the antistatic property, more preferably 5% to 50% by mass, and still more preferably 20% to 35% by mass. By the addition amount of 1% to 60% by mass, the binder component and the conductive polymer generate appropriate phase separation and a three-dimensional connection structure is formed.

As binder component (B1), the thermoplastic resins disclosed, for example, in JP-A-2002-322430, JP-A-2009-128488 and JP-A-2007-046031 can be used. Specifically, binder component (B1) can be selected from styrene resins, (meth)acrylic resins, vinyl ester resins, vinyl ether resins, halogen-containing resins, olefin resins (including alicyclic olefin resins), polycarbonate resins, polyester resins, polyamide resins, thermoplastic polyurethane resins, polysulfone resins (polyether sulfone, polysulfone, etc.), polyphenylene ether resins (polymers of 2,6-xylenol, etc.), cellulose derivatives (cellulose esters, cellulose carbamates, cellulose ethers, etc.), silicone resins (polydimethylsiloxane, polymethylphenylsiloxane, etc.), and rubbers or elastomers (diene-based rubbers such as polybutadiene and polyisoprene, styrenebutadiene copolymers, acrylonitrile-butadiene copolymers, acryl rubbers, urethane rubbers, silicone rubbers, etc.).

Preferred binder components (B1) are styrene resins, (meth)acrylic resins, vinyl ester resins, vinyl ether resins, halogen-containing resins, alicyclic olefin resins, polycarbonate resins, polyester resins, polyamide resins, cellulose derivatives, silicone resins, and rubbers or elastomers. When a plurality of polymers are used, resins which are noncrystal and soluble in an organic solvent (in particular, a common solvent capable of dissolving a plurality of polymers) are generally used. In particular, resins high in moldability, film-forming property, transparency and weather resistance, for example, styrene resins, (meth)acrylic resins, alicyclic olefin resins, polyester resins, and cellulose derivatives (cellulose esters and the like) are preferably used.

These polymers can be used in a proper combination of two or more. For example, in the combination of a plurality of polymers, at least one polymer is a cellulose derivative, in particular, cellulose esters (for example, cellulose (C2-4) alkylcarboxylates ester such as cellulose diacetate, cellulose triacetate, cellulose acetate propionate, cellulose acetate butyrate), and it may be combined with other polymers.

For maintaining film strength, it is preferred for binder component (B) to contain a repeating unit having a crosslinkable part. The crosslinkable part is preferably at least any of a hydroxyl group, a silyl group having a hydrolyzable group, a group having a reactive unsaturated double bond, a ring-opening polymerization reactive group, a group having an active hydrogen atom, a group capable of being substituted by a nucleophilic agent, and an acid anhydride. Further, the crosslinkable part may be introduced into the main chain or side chain, but it is generally incorporated into the side chain. The introducing amount to the thermoplastic resin of the crosslinkable groups concerning the crosslinking reaction may be 0.01 mols to 15 mols per kg of the thermoplastic resin, preferably 0.1 mols to 10 mols, and more preferably 0.5 mols to 7 mols or so.

Thermoplastic resins having a polymerizable group on the side chain can be manufactured, as disclosed in JP-A-2002-322430 and JP-A-2009-128488, for example, by reacting a thermoplastic resin (i) having a reactive group, a reactive group to the reactive group of the above thermoplastic resin (i), and a compound (ii) having a crosslinkable group, and introducing the crosslinkable group of the compound (ii) into the thermoplastic resin (i).

For lessening the affinity of the binder component with the conductive polymer and inducing phase separation, it is also preferred that the binder component (B1) is a fluorine-containing compound. The details of the compound will be described later.

The second preferred embodiment as binder component (B) is at least to contain a polymerizable compound (B2) having a molecular weight of 200 or more and less than 1,500.

As the polymerizable functional groups of the low molecular weight polymerizable compound (B2), a hydroxyl group, a silyl group having a hydrolyzable group, a group having a reactive unsaturated double bond, a ring-opening polymerization reactive group, a group having an active hydrogen atom, an acid anhydride, and a group capable of being substituted by a nucleophilic agent are exemplified. Of these groups, at least any of a group having a reactive unsaturated double bond and a ring-opening polymerization reactive group is preferred.

The examples of the compounds having a group having a reactive unsaturated double bond include di(meth)acrylate of alkylene glycol, e.g., neopentyl glycol acrylate, 1,6-hexanediol (meth)acrylate, propylene glycol di(meth)acrylate, etc.; di(meth)acrylate of polyoxyalkylene glycol, e.g., triethylene glycol di(meth)acrylate, dipropylene glycol di(meth)acrylate, polyethylene glycol di(meth)acrylate, polypropylene glycol di(meth)acrylate, etc.; di(meth)acrylate of polyhydric alcohol, e.g., pentaerythritol di(meth)acrylate, etc.; and di(meth)acrylate of ethylene oxide or propylene oxide adduct, e.g., 2,2-bis[4-(acryloxy-diethoxy)phenyl]propane, 2,2-bis[4-(acryloxy-propoxy)phenyl]propane, etc.

Further, epoxy (meth)acrylates, urethane (meth)acrylates, and polyester (meth)acrylates are also preferably used as photo-polymerizable polyfunctional monomers.

Above all, esters formed by polyhydric alcohols and (meth)acrylic acids are preferred. Polyfunctional monomers having three or more (meth)acryloyl groups in one molecule are more preferred. For example, pentaerythritol tetra(meth)acrylate, pentaerythritol tri(meth)acrylate, trimethylolpropane tri(meth)acrylate, trimethylopropane tri(meth)acrylate modified with ethylene oxide, trimethylolpropane tri(meth)acrylate modified with propylene oxide, phosphoric acid tri(meth)acrylate modified with ethylene oxide, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate, and tri(acryloxyethyl)isocyanurate modified with caprolactone are exemplified.

As the specific compounds of polyfunctional acrylate compounds having a (meth)acryloyl group, compounds described in JP-A-2009-098658, paragraphs [0119] to are exemplified.

In the preferred embodiment of the binder component (B2) in the invention, for lowering the affinity with the electrically conductive polymer and forming the three-dimensional network-like concentration distribution of the invention, in the above-exemplified compounds, it is preferred not to contain a hydroxyl group, an amido group, an ethylene oxide group and a propyleneoxy group in the molecule. By using such compounds, film strength can be heightened. By making the molecular weight of the binder component (B2) 200 or more, volatilization of the binder component (B2) during film forming can be restrained. Further, by the molecular weight of less than 1,500, compatibility with the conductive polymer is increased, which leads to coating solution stability and improvement of coating surface state.

The addition amount of the binder component (B2) is preferably 1% to 90% by mass in the solids content of the composition for forming the antistatic layer, more preferably 10% to 85% by mass, and still more preferably 20% to 85% by mass.

For reducing the affinity with the conductive polymer, the binder component (B2) is preferably a fluorine-containing compound. The details of the compound will be described later.

In the invention, especially preferred embodiment of the binder component (B) is an embodiment to contain a polymerizable compound (B2) having a molecular weight of 200 or more and less than 1,000 in addition to the binder having a molecular weight of 1,500 or more and less than 500,000 (high molecular weight binder (B1)). When the binder (B1) and binder (B2) are used in combination, binder (B2) is preferably high in the affinity with the conductive polymer, and in the compounds exemplified above in (B2), it is preferred to contain a hydroxyl group, an amido group, an ethylene oxide group and a propyleneoxy group in the molecule. Film strength can be raised by using the above low molecular weight polymerizable compound (B2). Further, the low molecular weight component (B2) moderately increases the affinity of the conductive polymer and the high molecular weight binder (B1), and so stability of the coating solution, stability of the coated surface, and adhesion among each component in the antistatic layer are improved.

The mass ratio of the electrically conductive polymer (A) and the binder component (B) is preferably 6/94 to 70/30, more preferably 6/94 to 50/50, and most preferably 10/90 to 40/60. As the binder component (B), when the binder (B1) and the binder (B2) are used in combination, the mass ratio of (B1) and (B2) is preferably 5/95 to 95/5, more preferably 15/85 to 85/15, and most preferably 20/80 to 50/50.

For the purpose of phase separation of the electrically conductive polymer and the binder component, at least one component constituting the binder component (B) is preferably a fluorine-containing curable compound. The preferred addition amount of the fluorine-containing compound is preferably 5% to 50% by mass to the sum total of the binder component (B), and more preferably 5% to 30% by mass.

The fluorine-containing curable compound may be either a polymer or monomer. When it is a fluorine-containing polymer, the polymer is preferably a polymer having a molecular weight of 1,500 or more and having a fluorine-containing part and a part having a functional group capable of concerning crosslinking reaction. On the other hand, in the case of a fluorine-containing monomer, it is preferably a polyfunctional fluorine monomer having a molecular weight of 200 or more and less than 1,500, and it is preferred for the polymerizable group to have any group selected from an acryloyl group, a methacryloyl group and —C(O)OCH═CH$_2$.

The fluorine-containing polymer and fluorine-containing monomer may be used as mixture. The details thereof are described below.

[Fluorine-containing Polymers]

The fluorine-containing polymer preferably has the structure represented by the following formula (1).

(MF1)$_a$-(MF2)$_b$-(MF3)$_c$-(MA)$_d$-(MB)$_e$     Formula (1)

In formula (1), each of a to e represents the molar fraction of each constitutional component, which is a value satisfying the following relationships: 30≦a+b≦70, 5≦d≦50, 0≦e≦20.

(MF1) represents a constitutional component polymerized from the monomer represented by CF$_2$═CF—Rf$_1$, and Rf$_1$ represents a perfluoroalkyl group having 1 to 5 carbon atoms.

(MF2) represents a constitutional component polymerized from the monomer represented by CF$_2$═CF—ORf$_{12}$, and Rf$_{12}$ represents a fluorine-containing alkyl group having 1 to 30 carbon atoms.

(MF3) represents a constitutional component polymerized from the monomer represented by CH$_2$═CH—ORf$_{13}$, and Rf$_{13}$ represents a fluorine-containing alkyl group having 1 to 30 carbon atoms.

(MA) represents a constitutional component having at least one or more crosslinkable group.

(MB) represents an optional constitutional component.

Each monomer in (MF1) to (MF3) (a compound represented by any of the following formulae (1-1) to (1-3) will be described below.

CF$_2$═CF—Rf$_1$     Formula (1-1)

In formula (1-1), Rf$_1$ represents a perfluoroalkyl group having 1 to 5 carbon atoms.

From the point of polymerization reactivity, the compound represented by formula (1-1) is preferably perfluoropropylene or perfluorobutylene, and especially preferably perfluoropropylene in view of availability.

CF$_2$═CF—ORf$_{12}$     Formula (1-2)

In formula (1-2), Rf$_{12}$ represents a fluorine-containing alkyl group having 1 to 30 carbon atoms. The fluoroalkyl group may have a substituent. Rf$_{12}$ represents a fluorine-containing alkyl group preferably having 1 to 20 carbon atoms, more preferably 1 to 10, and still more preferably a perfluoroalkyl group having 1 to 10 carbon atoms. The following are exemplified as the specific examples of Rf$_{12}$, but the invention is not restricted thereto.

—CF$_3$,     —CF$_2$CF$_3$,     —CF$_2$CF$_2$CF$_3$,     —CF$_2$CF(OCF$_2$CF$_2$CF$_3$)CF$_3$.

CH$_2$═CH—ORf$_{13}$     Formula (1-3)

In formula (1-3), Rf$_{13}$ represents a fluorine-containing alkyl group having 1 to 30 carbon atoms. The above fluoroalkyl group may have a substituent. Rf$_{13}$ may be straight chain or may have a branched structure. Rf$_{13}$ may have an alicyclic structure (preferably a 5- or 6-membered ring). Further, Rf$_{13}$ may have an ether bond between carbon-carbon. Rf$_{13}$ represents a fluorine-containing alkyl group preferably having 1 to 20 carbon atoms, and more preferably from 1 to 15 carbon atoms.

The following are exemplified as the specific examples of Rf$_{13}$, but the invention is not restricted thereto.

(Straight Chain Structure)

—CF$_2$CF$_3$, —CH$_2$(CF$_2$)aH, —CH$_2$CH$_2$(CF$_2$)aF (a: an integer of 2 to 12)

(Branched Structure)

—CH(CF$_3$)$_2$, —CH$_2$CF(CF$_3$)$_2$, —CH(CH$_3$)CF$_2$CF$_3$, —CH(CH$_3$)(CF$_2$)$_5$CF$_2$H (Alicyclic Structure)

A perfluorocyclohexyl group, a perfluorocyclopentyl group, and an alkyl group substituted with any of these groups (Others)

—CH$_2$OCH$_2$CF$_2$CF$_3$, —CH$_2$CH$_2$OCH$_2$(CF$_2$)$_b$H, —CH$_2$CH$_2$OCH$_2$(CF$_2$)$_b$F (b: an integer of 2 to 12), —CH$_2$CH$_2$OCF$_2$CF$_2$OCF$_2$CF$_2$H Further, as the monomers represented by formula (1-3), the compounds described in, e.g., JP-A-2007-298974, paragraphs [0025] to [0033] can be used.

(MA) in formula (1) represents a constitutional component having at least one or more crosslinkable group (a reactive group capable of concerning the crosslinking reaction).

As the examples of the crosslinkable groups, a hydroxyl group, a silyl group having a hydrolyzable group (e.g., an alkoxysilyl group, an acyloxysilyl group, etc.), a group having a reactive unsaturated double bond (e.g., a (meth)acryloyl group, an allyl group, a vinyloxy group, etc.), a ring-opening polymerization reactive group (e.g., an epoxy group, an oxetanyl group, an oxazolyl group, etc.), a group having an active hydrogen atom (e.g., a hydroxyl group, a carboxyl group, an amino group, a carbamoyl group, a mercapto group, a β-keto ester group, a hydrosilyl group, a silanol group, etc.), an acid anhydride, and a group capable of being substituted by a nucleophilic agent (e.g., an active halogen atom, a sulfonate ester, etc.) are exemplified.

(MB) in formula (1) represents an optional constitutional component. (MB) is not especially restricted so long as it is the constitutional component of a monomer copolymerizable with the monomers represented by (MF1) and (MF2) and the monomer for forming the constitutional component represented by (MA), and it can be arbitrarily selected from various viewpoints, e.g., adhesion to the base material, Tg of the polymer (contributing to film hardness), solubility in a solvent and transparency.

As the monomers for forming (MB), vinyl ethers, e.g., methyl vinyl ether, ethyl vinyl ether, n-butyl vinyl ether, cyclohexyl vinyl ether, and isopropyl vinyl ether; and vinyl esters, e.g., vinyl acetate, vinyl propionate, vinyl butyrate, and vinyl cyclohexanecarboxylate are exemplified.

[Fluorine-containing Monomers]

The fluorine-containing monomer is a compound having an atomic group mainly consisting of a plurality of fluorine atoms and carbon atoms (oxygen atoms and hydrogen atoms may be partially contained) not substantially concerning polymerization (hereinafter also referred to as "fluorine-containing core part) and having polymerizability such as radical polymerization, ionic polymerization, or condensation polymerization via a linking group such as an ester bond or an ether bond and, wherein the fluorine-containing monomer preferably contains two or more polymerizable groups.

The fluorine-containing monomer is preferably a compound represented by the following formula (I) (polymerizable fluorine-containing compound).

$$Rf[-(L)_m-Y]_n \quad \text{Formula (I)}$$

In formula (I), Rf represents a chain-like or cyclic n-valent group which contains at least a carbon atom and a fluorine atom, and may contain an oxygen atom and a hydrogen atom; n represents an integer of 2 or more; L represents a single bond or a divalent linking group; m represents 0 or 1; and Y represents a polymerizable group.

In formula (I), Y represents a polymerizale group. Y is preferably a radical polymerizable, ionic polymerizable, or condensation polymerizable group, more preferably a polymerizable unsaturated group or a ring-opening polymerizable group, and still more preferably a polymerizable unsaturated group. Specifically, Y is preferably selected from a (meth) acryloyl group, an allyl group, an alkoxysilyl group, an α-fluoroacryloyl group, an epoxy group, and —C(O) OCH=CH$_2$. Of these, in view of polymerizability, a radical polymerizable or cationic polymerizable (meth)acryloyl group, allyl group, α-fluoroacryloyl group, epoxy group, or —C(O)OCH=CH$_2$ is preferred, a radical polymerizable (meth)acryloyl group, allyl group, α-fluoroacryloyl group, or —C(O)OCH=CH$_2$ is especially preferred, and (meth)acryloyl group or —C(O)OCH=CH$_2$ is most preferred.

The polymerizable fluorine-containing compound may be a crosslinking agent polymerizable group crosslinking group with the polymerizable group being a crosslinking group.

As the examples of the crosslinking groups, a hydroxyl group, a silyl group having a hydrolyzable group (e.g., an alkoxysilyl group, an acyloxysilyl group, etc.), a group having a reactive unsaturated double bond (e.g., a (meth)acryloyl group, an allyl group, a vinyloxy group, etc.), a ring-opening polymerization reactive group (e.g., an epoxy group, an oxetanyl group, an oxazolyl group, etc.), a group having an active hydrogen atom (e.g., a hydroxyl group, a carboxyl group, an amino group, a carbamoyl group, a mercapto group, a β-keto ester group, a hydrosilyl group, a silanol group, etc.), an acid anhydride, and a group capable of being substituted by a nucleophilic agent e.g., (an active halogen atom, a sulfonate ester, etc.) are exemplified.

L represents a single bond or a divalent linking group, preferably an alkylene group having 1 to 10 carbon atoms, an arylene group having 6 to 10 carbon atoms, —O—, —S—, —N(R)—, and a divalent linking group obtained by combining two or more of these groups. R represents a hydrogen atom or an alkyl group having 1 to 5 carbon atoms.

When L represents an alkylene group or an arylene group, the alkylene group and arylene group are preferably substituted with a halogen atom, and more preferably substituted with a fluorine atom.

(Solvents)

It is preferred that the composition for forming an antistatic layer contains a solvent. Various kinds of solvents selected from the points of capable of dissolving or dispersing each component, capable of making an even surface in the coating process and drying process, capable of securing liquid conservation, and having proper saturated vapor pressure can be used. The solid content concentration in the coating composition for forming the antistatic layer is preferably 0.5% to 80% by mass, more preferably 1% to 50% by mass, and most preferably 1% to 40% by mass.

Further, in the invention, conductive polymer (A), binder component (B), and if necessary, other components are homogeneously dissolved or dispersed to obtain a coating composition. The solvent is evaporated in the drying process of the film, as a result each component cannot be uniformly dissolved or dispersed and preferably a sea-island structure is formed, and a three-dimensional network structure (a conductive network structure) by the electrically conductive polymer is formed.

Two or more kinds of solvents can be used as mixture in view of surface stability of the film and for avoiding deterioration of surface state and haze increase.

When two or more solvents are mixed, it is preferred that at least one solvent is a good solvent of electrically conductive polymer (A), and at least one solvent is a good solvent of binder component (B).

The mixing ratio of both is preferably 1/9 to 9/1, and more preferably 2/8 to 8/2. The boiling temperature of solvents is not restricted, but from the aspects of handling property and reduction of drying load, solvents having a boiling temperature of 50° C. or more and 200° C. or less are preferred.

From the point of surface stability of the film, it is preferred that the boiling temperature of the good solvent of electrically conductive polymer (A) is higher than the boiling temperature of the good solvent of binder component (B).

The examples of preferred solvents are shown below, but the invention is not restricted thereto. Boiling temperatures are shown in the parentheses.

As good solvents of electrically conductive polymer (A), tetrahydrofuran (66° C.), acetone (56° C.), ethanol (78° C.), isopropyl alcohol (82° C.), acetonitrile (82° C.), propylene glycol monomethyl ether (120° C.), propylene glycol monoethyl ether (132° C.), propylene glycol monobutyl ether (171° C.), propylene glycol monomethyl ether acetate (PGMEA) (146° C.), propylene glycol monoethyl ether acetate (PGM-Ac) (145° C.), ethylene glycol monomethyl ether (124° C.), ethylene glycol monoethyl ether (135° C.), ethylene glycol monoethyl ether acetate (156° C.), and ethylene glycol diethyl ether (121° C.) are exemplified.

As good solvents of binder component (B), methyl ethyl ketone (80° C.), cyclohexanone (156° C.), methyl isobutyl ketone (116° C.), toluene (111° C.), xylene (138° C.), ethyl acetate (77° C.), and isopropyl acetate (89° C.) are exemplified.

Here, "good solvents" mean that a solvent having excellent solubility of resins and degree of swelling, and "poor solvents" mean that a solvent which has low solubility of resins and liable to cause gelatification.

In addition to the above solvents, the compounds disclosed in JP-A-2008-151866 can be used in the invention.

As another preferred example using two or more kinds of organic solvents, to use two kinds of solvents having the difference in boiling temperature greater than the specific value is exemplified. The difference in boiling temperature of two kinds of solvents is preferably 25° C. or more, more preferably 35° C. or more, and still more preferably 50° C. or more. It is preferred that the boiling temperature of the good solvent of electrically conductive polymer (A) is higher than the boiling temperature of the good solvent of binder component (B). The network structure of the conductive polymer is easily formed due to large difference in boiling temperature.

[Other Components]

If necessary, the antistatic layer of the invention can contain an ionizing radiation polymerization initiator, a thermal radical initiator, a leveling agent, inorganic particles, a pigment, a thickening agent, a light-scattering agent, an ultraviolet absorber and a stain-proofing agent. The techniques disclosed in JP-A-2007-298974 can be used.

Further, crosslinking particles can be added to the antistatic layer of the invention. Curing and shrinking amount of the antistatic layer can be reduced by the addition of crosslinking particles, so that the adhesion with the base material is improved and curling can be reduced when the base material is a plastic film. Further, crosslinking particles can be added for the purpose of revelation of antiglare property. As the crosslinking particles, any of inorganic crosslinking particles, organic crosslinking particles, and organic-inorganic composite crosslinking particles can be used with no limitation. The particles described in JP-A-2003-147017, paragraphs [0074] to [0079] can be used.

[Forming Methods of Layer]

In the forming method of each layer, curing conditions suitable for the curable functional groups of each component for use in each layer can be selected.

(A) Systems Using Compounds Capable of Reaction by Heating

Curing temperature is preferably 60° C. to 200° C., more preferably 80° C. to 130° C., and most preferably 80° C. to 110° C. When the support is liable to deteriorate at high temperature, low temperature is preferred. Time required for crosslinking is preferably 30 sec to 60 min, and more preferably 1 min to 20 min.

(B) System Using Compounds Capable of Curing by Irradiation with Ionizing Radiation as Trigger When compounds capable of curing by irradiation with ionizing radiation as trigger are used, curing can be effectively performed by combining irradiation with ionizing radiation and heat treatment before irradiation, at the same time with irradiation and after irradiation.

Several patterns of manufacturing process are shown in Table 1 below, but the invention is not restricted thereto.

In addition to the following, a process of performing heat treatment simultaneously with ionizing radiation curing is also preferred.

TABLE 1

| | Before Irradiation | → | Irradiation | → | After Irradiation |
|---|---|---|---|---|---|
| (1) | Heat treatment | → | Ionizing radiation curing | → | — |
| (2) | Heat treatment | → | Ionizing radiation curing | → | Heat treatment |
| (3) | — | → | Ionizing radiation curing | → | Heat treatment |

(— means that heat treatment is not carried out.)

(Heat Treatment)

In the invention, as described above, it is preferred to perform heat treatment in combination with irradiation with ionizing radiation. Heat treatment is not especially restricted so long as the support and constitutional layer of the laminate are not damaged, but is preferably 60° C. to 200° C., more preferably 80° C. to 130° C., and most preferably 80° C. to 110° C.

(Condition of Irradiation with Ionizing Radiation)

The film surface temperature at the time of irradiation with ionizing radiation is not especially restricted but from the handling property and uniformity of performance in the plane, but is generally 20° C. to 200° C., preferably 30° C. to 150° C., and most preferably 40° C. to 120° C. When the film surface temperature is the least upper bound or lower, the film surface is free from deterioration by increased fluidity of the low molecular component in the binder, and the problem of damage of the support by heat does not rise. Further, when the temperature is the greatest lower bound or higher, advancement of curing reaction is sufficient and satisfactory abrasion resistance of the film is secured. The kind of ionizing radiation is not especially restricted, and X-ray, electron beam, UV ray, visible ray, and infrared ray are exemplified, but UV ray is widely used. For example, when the film is curable with UV ray, curing is preferably performed by irradiation with UV ray of an irradiation quantity of 10 mJ/cm$^2$ to 1,000 mJ/cm$^2$ by using a UV ray lamp. In irradiation, the above energy may be applied at one time, or may be applied in several times. Time of irradiation can be arbitrarily selected in the range of 0.1 sec to 100 sec or so.

(Oxygen Concentration)

The concentration of oxygen at the time of ionizing radiation irradiation is preferably 3% by volume or less, more preferably 1% by volume or less, and still more preferably 0.1% by volume or less. By providing a process of retaining the film in an atmosphere of oxygen concentration of 3% by volume or less immediately before and immediately after the process of ionizing radiation irradiation in oxygen concentration of 3% by volume or less, curing of the film is sufficiently accelerated, and a film excellent in physical strength and chemical resistance can be formed.

(Layer Structure of Laminate)

The laminate of the invention can be applied to an optical film for an image display device (a hard coat film, an antireflection film), an antireflection film for a solar battery cell, members of non-display faces of general domestic electric appliances (a stain-proofing layer and an antistatic layer), a decorative sheet, a wall paper, and a base material for protecting the dial of a watch. When the laminate of the invention is the optical film for an image display device, it is preferred to use the conductive layer of the invention as the hard coat layer.

Further, for reducing reflection and improving denseness of black, it is preferred to provide a low refractive index layer having a refractive index lower than that of the support on the hard coat layer.

For further reducing reflectance, a high refractive index layer having a refractive index higher than that of the support may be provided. Further, functional layers having various functions, such as an ultraviolet ray/infrared ray absorbing layer, a selective wavelength absorbing layer, an electromagnetic shield layer and a stain-proofing layer can be provided. These functional layers can be manufactured with conventionally known techniques. According to cases, besides the layers having the antistatic effect in the invention, a second antistatic layer (a layer containing an antistatic agent) may be formed.

The thickness of the antistatic layer of the laminate of the invention is preferably 0.05 μm to 100 μm, more preferably 0.08 μm to 50 μm, and most preferably 0.1 μm to 30 μm.

[Base Materials]

As the base material (support) of the laminate of the invention, a glass substrate, a substrate of inorganic oxide material, a substrate of metal material, a plastic substrate, a plastic film, paper and cloth can be used. Above all, it is preferred to use a transparent plastic film for easiness of post-processing, easiness of continuous manufacture and promising market. As the polymers for forming a plastic film, cellulose ester (e.g., triacetyl cellulose, diacetyl cellulose, as representatives: TAC TD80U, TAC TD80UF, manufactured by Fuji Photo Film Co., Ltd.), polyamide, polycarbonate, polyester (e.g., polyethylene terephthalate, polyethylene naphthalate), polystyrene, polyolefin, norbornene resins (Arton, trade name, manufactured by JSR Corporation), and amorphous polyolefin (Zeonex, trade name, manufactured by Zeon Corporation) are exemplified. Of these compounds, triacetyl cellulose, polyethylene terephthalate and polyethylene naphthalate are preferred, and triacetyl cellulose is especially preferred. Cellulose acylate film not containing halogenated hydrocarbon such as dichloromethane and the manufacturing method are described in Hatsumei Kyokai Kokai Giho, Kogi No. 2001-1745 (hereinafter abbreviated to Kokai Giho, No. 2001-1745) (published by Hatsumei Kyokai, Mar. 15, 2001), and cellulose acylate described therein is also preferably used.

[Manufacturing Method of Laminate]

The antistatic layer of the invention can be manufactured according to the following method, but the invention is not restricted thereto.

In the first place, a coating solution containing the composition for forming each layer is prepared. The obtained coating solution is coated on a support, heated, and dried. As coating methods, a dip coat method, an air knife coat method, a curtain coat method, a roller coat method, a wire bar coat method, a gravure coat method, and extrusion coat method (refer to U.S. Pat. No. 2,681,294). When a gravure coat method is used in coating, a uniform film thickness can be obtained with a small amount of coating solution. Of gravure coat methods, a further uniform film thickness is secured according to a micro gravure method, and so preferred.

A highly uniform film thickness can also be obtained with a small amount of coating solution according to a die coat method. Since the die coat method is a pre-measuring system, control of a film thickness is relatively easy and the coating solvent is evaporated a little at the coating part, and so preferred.

Two or more layers may be coated at the same time. Simultaneous coating method is described in U.S. Pat. Nos. 2,761,791, 2,941,898, 3,508,947 and 3,526,528, and Yuji Harasaki, Coating Kogaku (Coating Engineering), p. 253, Asakura Shoten (1973).

[Saponification Treatment]

When the antistatic laminate in the invention is used in a liquid crystal display, an adhesive layer is generally provided on one side thereof and it is arranged on the outermost surface of the display. When the support is triacetyl cellulose, since the triacetyl cellulose film can be used as the protective film for protecting the polarizing film of the polarizing plate, using the antireflection film of the invention as the protective film as it is preferably saves the manufacturing costs.

As described above, when the antistatic laminate in the invention is arranged on the outermost surface of a display or used as it is as the protective film for a polarizing plate, it is preferred to form a low refractive index layer on the support and then the laminate is subjected to saponification treatment for improving adhesion.

Saponification treatment is disclosed in JP-A-2006-293329, paragraphs [0289] to [0293], and the description is also applied to the invention.

[Polarizing Plate]

A polarizing plate mainly includes a polarizing film and a protective film for protecting it. The antireflection film in the invention is preferably used as the protective film of a polarizing film. Since the antireflection film in the invention also serves as the protective film, the manufacturing costs of a polarizing plate can be reduced. Known polarizing films can be used as the polarizing film in the invention. Polarizing films described in JP-A-2006-293329, paragraphs [0299] to [0301] are also applied to the invention.

[Image Display Device]

The antistatic laminate in the invention can be used in various image displays such as a liquid crystal display (LCD), a plasma display panel (PDP), an electroluminescence display (ELD), a cathode ray tube (CRT), a field emission display (FED), and a surface-conduction electron-emitter display (SED) for giving antistatic property and hard coat property. The laminate, optical film, or polarizing plate including laminate of the invention is preferably arranged on the surface of the display of a liquid crystal display device (on the visible side of display screen).

When the antistatic laminate in the invention is used as one side of the surface protective film of a polarizing film, it can be preferably used for transmitting type, reflection type and semi-transmitting type liquid crystal display devices of the modes of twisted nematic (TN), super twisted nematic (STN), vertical alignment (VA), in-plane switching (IPS), optically compensated Bend Cell (OCB), and electrically controlled birefringence (ECB). Liquid crystal displays are described in JP-A-2006-293329, paragraphs

EXAMPLE

The invention will be described with reference to examples, but the invention is by no means restricted thereto. In the examples, "parts" and "%" are mass basis unless otherwise indicated.

[Preparation of a Coating Solution for Forming an Antistatic Layer]

Coating solutions A-1 to A-19 each having solid content concentration of 20% by mass are prepared by mixing each component in the ratio as shown in Table 2. The addition amount in Table 2 shows the solid content of each material in terms of parts by mass. Each coating solution is prepared by adding the binder component, polymerization initiator, filler and surface modifier to the electrically conductive polymer, and adjustment is performed according to necessity by evaporating the solvent with the evaporator or additionally adding a solvent so that the solid content ratio of the coating solution at large becomes 20% by mass. When two kinds of diluent solvents are used in Table 2, the mass ratio of the diluents is shown.

TABLE 2

| | Content (solid content) | | | | | | | | | | | |
|---|---|---|---|---|---|---|---|---|---|---|---|---|
| | (A) Conductive Polymer | | (B) Binder Component | | Polymerization Initiator | | Filler | | Other Additive | | Diluent Solvent |
| | Kind | Amount Added | Kind | Amount Added | Kind | Amount Added | Kind | Amount Added | Kind | Amount Added | |
| A-1 | (A) Polyaniline | 20 | — | — | PET-30 | 77 | Irgacure 127 | 3 | — | — | — | — | MEK |
| A-2 | (A) Polyaniline | 35 | — | — | PET-30 | 62 | Irgacure 127 | 3 | — | — | FP-13 | 0.1 | MEK |
| A-3 | (A) Polyaniline | 50 | — | — | PET-30 | 47 | Irgacure 127 | 3 | — | — | FP-13 | 0.1 | Toluene |

TABLE 2-continued

| | (A) Conductive Polymer | | (B) Binder Component | | | | Polymerization Initiator | | Filler | | Other Additive | | |
|---|---|---|---|---|---|---|---|---|---|---|---|---|---|
| | Kind | Amount Added | Kind | Amount Added | Kind | Amount Added | Kind | Amount Added | Kind | Amount Added | Kind | Amount Added | Diluent Solvent |
| A-4 | (A) Polyaniline | 30 | — | — | TMPTA | 67 | Irgacure 127 | 3 | — | — | FP-13 | 0.1 | Toluene |
| A-5 | (A) Polyaniline | 10 | B-1 | 5 | PET-30 | 82 | Irgacure 127 | 3 | — | — | FP-13 | 0.1 | Toluene |
| A-6 | (A) Polyaniline | 20 | B-1 | 15 | PET-30 | 62 | Irgacure 127 | 3 | — | — | FP-13 | 0.1 | MEK(80)/PGMEA(20) |
| A-7 | (A) Polyaniline | 20 | B-2 | 30 | PET-30 | 47 | Irgacure 127 | 3 | — | — | FP-13 | 0.1 | MEK(80)/PGMEA(20) |
| A-8 | (B) Polyaniline | 10 | B-2 | 40 | DPHA | 47 | Irgacure 127 | 3 | — | — | FP-13 | 0.1 | MEK(80)/PGMEA(20) |
| A-9 | (C) Polythiophene | 30 | B-3 | 10 | DPHA | 57 | Irgacure 127 | 3 | — | — | FP-13 | 0.1 | MEK(80)/PGMEA(20) |
| A-10 | (D) Polythiophene | 20 | B-3 | 15 | DPHA | 62 | Irgacure 127 | 3 | — | — | FP-13 | 0.1 | MEK(80)/PGMEA(20) |
| A-11 | Quaternary ammonium salt (PQ-10) | 30 | B-3 | 10 | DPHA | 57 | Irgacure 127 | 3 | — | — | FP-13 | 0.1 | MEK(80)/PGMEA(20) |
| A-12 | (D) Polythiophene | 15 | B-3 | 25 | DPHA | 47 | Irgacure 127 | 3 | Acryl particles (3 μm) | 10 | FP-13 | 0.1 | MEK(80)/PGMEA(20) |
| A-13 | (D) Polythiophene | 20 | F-1 | 25 | DPHA | 42 | Irgacure 127 | 3 | Acryl particles (3 μm) | 10 | FP-13 | 0.1 | MEK(80)/PGMEA(20) |
| A-14 | (D) Polythiophene | 20 | P-1 | 15 | DPHA | 52 | Irgacure 127 | 3 | Acryl particles (3 μm) | 10 | FP-13 | 0.1 | MEK(80)/PGM-Ac(20) |
| A-15 | (A) Polyaniline | 30 | B-1 | 47 | — | — | Irgacure 127 | 3 | Acryl particles (3 μm) | 20 | FP-13 | 0.1 | MEK(80)/PGMEA(20) |
| A-16 | (D) Polythiophene | 20 | B-4/B-1 | 10/5 | DPHA | 62 | Irgacure 127 | 3 | — | — | FP-13 | 0.1 | MEK(80)/PGMEA(20) |
| A-17 | (D) Polythiophene | 25 | B-3 | 25 | DPHA | 47 | Irgacure 127 | 3 | — | — | FP-13 | 0.1 | Toluene (85)/Cyclohexanone (15) |
| A-18 | (A) Polyaniline | 20 | B-1 | 15 | PET-30 | 62 | Irgacure 127 | 3 | — | — | FP-13 | 0.1 | Toluene |
| A-19 | (A) Polyaniline | 30 | B-3/B-5 | 10/10 | DPHA | 45 | Irgacure 127 | 3/2 | — | — | FP-13 | 0.1 | MEK(80)/PGMEA(20) |

In Table 2, the details of each component are as follows.
(Electrically Conductive Polymer)

Dispersions (A) to (D) each containing a conductive polymer are prepared as follows.

Preparation Example 1

Manufacture of Dispersion (A) of a Conductive Polymer

Toluene (200 g), 2 g of aniline, 4.2 g of dodecylbenzenesulfonic acid, 1.0 g of polyacrylic acid derivative, and 0.03 g of 4-methylaniline are dissolved, and 60 g of distilled water in which 3.58 mL of 6N hydrochloric acid is dissolved is added.

After adding 180 mg of tetrabutyl ammonium bromide to the above mixed solution and cooling the solution to 5° C. or lower, 30 g of distilled water in which 5.4 g of ammonium persulfate is dissolved is added. After continuing oxidation polymerization for 4 hours at 5° C. or less, toluene is removed by vacuum distillation.

After that, polyaniline precipitate is filtered and washed with water to obtain aniline of the object. The obtained polyaniline is dispersed in 200 g of toluene and, after removing the aqueous layer, the concentration is adjusted to 2% by mass to thereby obtain toluene dispersion (A). (The obtained conductive polymer is a compound containing polyaniline doped with dodecylbenzenesulfonic acid. The relative dielectric constant of toluene of the solvent is 2.2.)

Preparation Example 2

Manufacture of Dispersion (B) of a Conductive Polymer

Aniline (400 g) is dissolved with 6,000 g of distilled water and 400 mL of 36% hydrochloric acid. After that, 500 g of a sulfuric acid aqueous solution of 5 mol/L is added thereto and cooled at −5° C.

In the next place, an oxidant aqueous solution is prepared by adding 980 g of ammonium peroxodisulfate (4.295 mols) to 2,293 g of distilled water in a beaker. After that, the above ammonium peroxodisulfate aqueous solution is gradually dripped into acidic aqueous solution of aniline salt under stirring while cooling at −5° C. to obtain dark green precipitate. Subsequently, the obtained polymer precipitate is filtered, washed with water, acetone, and subjected to vacuum drying at room temperature to thereby obtain quinonediimine-phenylenediamine type conductive polyaniline powder. Phenylhydrazine 1.49 g is dissolved in 90 g of N-methyl-2-pyrrolidone, and then 10 g of the above solvent-soluble quinonediimine-phenylenediamine type polyaniline is dissolved under stirring. Separately, 5 g of 1,5-naphthalenedisulfonic acid tetrahydrate and 2.92 g of diethanolamine are dissolved in 58.92 g of N-methyl-2-pyrrolidone. The solution of the obtained 1,5-naphthalenedisulfonic acid (3.33 g) is mixed with 5 g of the above polyaniline solution, and the mixture is subjected to defoaming treatment. The solvent is diluted to reach solvent composition of N-methyl-2-pyrrolidone/methyl ethyl ketone of 1/1% by mass, and polyaniline dispersion (B) having solid content concentration of 4% by mass is obtained. (The obtained conductive polymer is a compound containing polyaniline doped with 1,5-naphthalenedisulfonic acid. The average relative dielectric constant of the solvent is 23.8.)

Preparation Example 3

Manufacture of Dispersion (C) of a Conductive Polymer

To 1,000 mL of an aqueous solution of 2% by mass of polystyrenesulfonic acid (number average molecular weight: about 100,000) is added 8.0 g of 3,4-ethylenedioxythiophene and mixed at 20° C. To the mixed solution is added 100 mL of an oxidation catalyst liquid (containing ammonium persulfate of 15% by mass and ferric sulfate of 4.0% by mass) and reacted at 20° C. for 3 hours.

After adding 1,000 mL of ion exchange water to the above reaction solution, about 1,000 mL of the solution is removed by ultrafiltration. This operation is repeated three times.

To the obtained solution, 100 mL of sulfuric acid aqueous solution (10% by mass) and 1,000 mL of ion exchange water are added and about 1,000 mL of the solution is removed by ultrafiltration. After adding about 1,000 mL of ion exchange water to the obtained liquid, about 1,000 mL of the liquid is removed by ultrafiltration. This operation is repeated five times. By these operations, PEDOT•PSS aqueous solution of about 1.1% by mass is obtained. The solid content concentration is adjusted with ion exchange water to an aqueous solution of 1.0% by mass to prepare an organic conductive polymer solution (C'). This solution (C') is an aqueous solution and the dielectric constant of water is 80. Acetone (200 mL) is added to 200 mL of an aqueous solution of the above prepared PEDOT•PSS(C'), and water and 210 mL of acetone are removed by ultrafiltration. This operation is repeated one time, and the solid content concentration is adjusted with acetone to prepare water/acetone solution of 1.0% by mass. Acetone (500 mL) in which 2.0 g of trioctylamine is dissolved is added to 200 mL of the solution, followed by stirring with a stirrer for 3 hours. Water and 510 mL of acetone are removed by ultrafiltration. The solid content concentration is adjusted with acetone to make an acetone solution of 1.0% by mass, and conductive polymer solution (C) is prepared.

Preparation Example 4

Manufacture of Dispersion (D) of a Conductive Polymer

Methyl ethyl ketone (300 mL) is added to 200 mL of solution (C) of PEDOT•PSS prepared in Preparation Example 3 and mixed, and the solution is concentrated under reduced pressure at room temperature to make the total amount of 200 mL. The solid content concentration is adjusted with methyl ethyl ketone to a methyl ethyl ketone solution of 1.0% by mass, and conductive polymer solution (D) is prepared.

PQ-10: High molecular weight type cationic antistatic agent (acrylic resin containing quaternary ammonium salt, trade name: PQ-10, manufactured by Soken Chemical & Engineering Co., Ltd.)

(High Molecular Weight Binder)
High Molecular Weight Binder B-1:
Cellulose acetate propionate (degree of acetylation: 2.5%, degree of propionylation: 46%, number average molecular weight by GPC method, in terms of polystyrene: 75,000, manufactured by Eastman Chemical Company, CAP-482-20)

High Molecular Weight Binder B-2:
(Meth)acryl polymer having a 2-hydroxyethyl group and a 2,3-dihydroxypropyl group (manufactured by Dainippon Ink and Chemicals Inc., trade name: PC1070)

High Molecular Weight Binder B-3:
Binder B-3 is synthesized according to the following method.

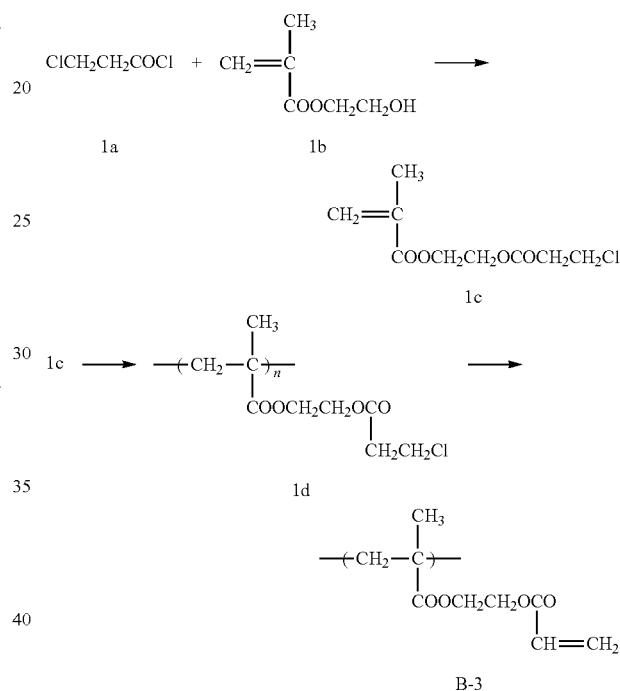

1b (3.0 mol) is dissolved in 1,400 mL of tetrahydrofuran (THF) and the reaction vessel is cooled to 5° C. 1a (3.15 mol) is dripped thereto over 1 hour, and then reacted for 6 hours. The obtained reaction solution is concentrated at 30° C. under reduced pressure and then distilled under reduced pressure. A fraction is carried out under reduced pressure of 133 Pa, 118 to 121° C., and purified by silica gel column chromatography (eluate:acetone/hexane: 5/95 (volume ratio)) to obtain 362 g of 1c. In the next place, after stirring 275 mL of methyl ethyl ketone (MEK) under nitrogen flow at 60° C. for 1 hour, 0.5 g of V-65 (polymerization initiator, manufactured by Wako Pure Chemical Industries) is dissolved in 8.3 mL of MEK, and all the amount of this solution is added thereto. After that, 1c (50 g) is dripped over 2 hours, after termination of dripping, MEK (8.3 mL) solution of V-65 (0.5 g) is added and reacted for 2 hours. Then, the reaction temperature is raised to 80° C. and reacted for 2 hours. After termination of reaction, the temperature is lowered to room temperature. The obtained reaction solution is dripped to 10 liters of hexane over 1 hour. The precipitate is dried at 35° C. for 8 hours under reduced pressure to obtain 43 g of 1d. Subsequently, 1d (43 g) is dissolved in acetone (390 mL) and cooled to 5° C. Triethylamine (390 mmol) is dripped thereto over 1 hour, and after termination of dripping, reacted at room temperature for 24 hours. After that, the reaction vessel is cooled at 5° C., 29.3 mL of 6N hydrochloric aqueous solution is dripped over 1 hour, and after termination of dripping, stirred for 1 hour. Ethyl acetate (1 liter) and sodium chloride aqueous solution of 10% by mass (1 liter) are added to the obtained reaction solution and stirred, and the aqueous layer is separated. The organic layer is washed two times with a sodium chloride aqueous solution of 10% by mass (1 liter), 100 g of sodium sulfate is added thereto, and the reaction solution is dried for 1 hour, and then sodium sulfate is filtered. The obtained solution is concentrated to 500 mL, dripped to 10 liters of hexane, the precipitate is dried at 20° C. for 8 hours under reduced pressure to obtain 33 g of exemplified compound B-3. The number average molecular weight by GPC method of the manufactured polymeric compound is 12,000 in terms of polystyrene.

High Molecular Weight Binder B-4:

Acrylic resin having a polymerizable unsaturated group on the side chain (Cyclomer P ACA320, 1-methoxy-2-propanol solution, molecular weight: 20,000 to 26,000 (weight average molecular weight by GPC in terms of polystyrene)

High Molecular Weight Binder B-5:

Ring-opening polymerizable polymer binder containing an epoxy group on the side chain is synthesized according to the following method.

After stirring 275 mL of methyl ethyl ketone (MEK) under nitrogen flow at 60° C. for 1 hour, 0.5 g of V-65 (polymerization initiator, manufactured by Wako Pure Chemical Industries) is dissolved in 8.3 mL of MEK, and all the amount of this solution is added. After that, glycidyl methacrylate (50 g) is dripped over 2 hours, after termination of dripping, MEK (8.3 mL) solution of V-65 (0.5 g) is added and reacted for 2 hours. Then, reaction is continued for 2 hours at reaction temperature of 80° C. After termination of reaction, the temperature is lowered to room temperature. The obtained reaction solution is dripped to 10 liters of hexane over 1 hour. The precipitate is dried at 35° C. for 8 hours under reduced pressure to obtain 45 g of polymeric compound B-5. The number average molecular weight by GPC method of the manufactured polymeric compound is 20,000 in terms of polystyrene.

(Synthesis of Polyfunctional Fluorine-containing Monomer (F-1))

Compound (F-1) shown as specific example of a polyfunctional fluorine-containing monomer is synthesized according to the following route.

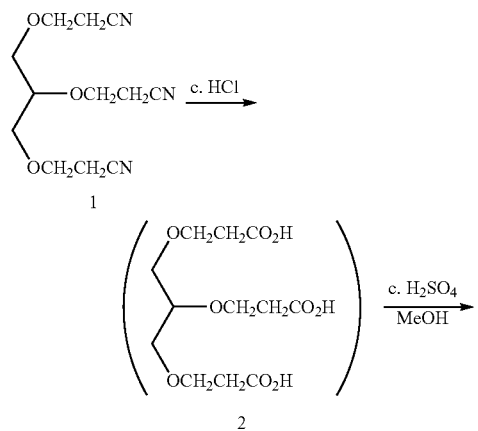

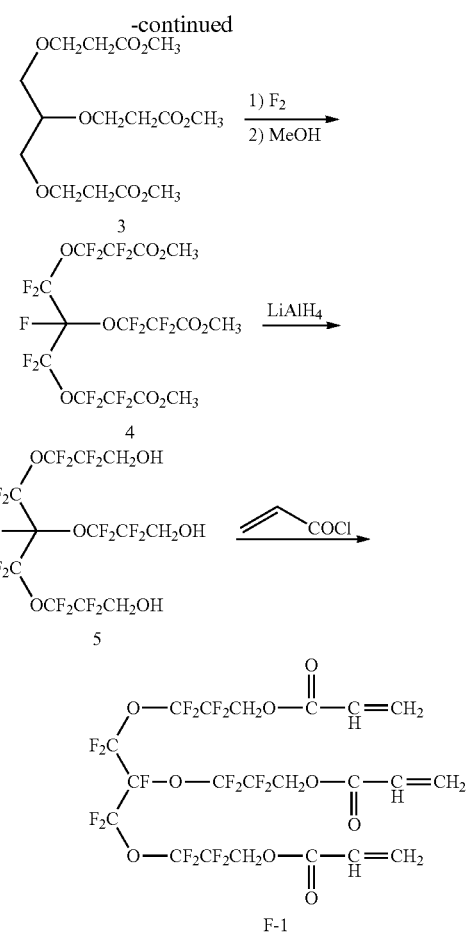

(Synthesis of Compound 3)

A solution of compound I known in document (e.g., refer to Journal of American Chemical Society, 70, 214 (1948)) (36.6 g, 145.6 mmol)/methanol (4 mL) is dripped to concentrated hydrochloric acid (110 mL) at 50° C. over 1 hour. The reaction solution is stirred at 65° C. for 6 hours, and then cooled to 35° C. and methanol (80 mL) is added. Stirring is continued for further 5 hours at the same temperature. The reaction solution is extracted with toluene (150 mL)/brine of 10% by mass (100 mL) and the organic layer is concentrated under reduced pressure. Methanol (40 mL) and concentrated hydrochloric acid (1 mL) are added to the concentrated residue and stirring is continued at room temperature for 4 hours. After extraction of the reaction solution with toluene (150 mL)/aqueous sodium bicarbonate of 7.5% by mass (150 mL), the organic layer is washed with brine of 25% by mass (150 mL) and dried over sodium sulfate. After distilling the solvent under reduced pressure, the residue is purified by column chromatography (developing solvent:ethyl acetate/hexane=1/3) to obtain compound 3 (40.8 g, 116.5 mmol, 80%).

(Synthesis of Compound 4)

Chlorofluorocarbon solvent (750 mL) is put in a 1 liter Teflon (registered trademark) vessel equipped with an exhaust vent connected to a fluorine trap via a raw material supply port, a fluorine supply port, a helium gas supply port and a reflux condenser cooled with dry ice, and helium gas is flown at a flow rate of 100 mL/min for 30 minutes at inner temperature of 30° C. Subsequently, 20% $F_2/N_2$ gas is flown at a flow rate of 100 mL/min for 30 minutes, and a mixed solution of compound 3 (15 g, 42.8 mmol) and hexafluorobenzene (4.0 mL) is added at a rate of 1.1 mL/h at fluorine flow rate of 200 mL/min. After lowering the fluorine flow rate to 100 mL/min, hexafluorobenzene (1.2 mL) is added at a rate of 0.6 mL/h, and further, 20% $F_2/N_2$ gas is flown at a flow rate of 100 mL/min for 15 minutes. After replacing the reaction vessel with helium gas, methanol (100 mL) is added, stirred for 1 hour, and the solvent is distilled off under reduced pressure. The concentrated residue is washed with an aqueous solution of ether/sodium bicarbonate, and the ether layer is dried over magnesium sulfate. After distilling ether, the residue is distillation purified at 2 mmHg to obtain compound 4 (17.4 g, 26.5 mmol, 62%).
(Synthesis of Compound 5)

Lithium aluminum hydride (3.5 g) is dispersed in diethyl ether (300 mL), and diethyl ether solution (100 mL) of compound 4 (10 g, 15.2 mmol) is dripped at a temperature of 10° C. or less. The reaction solution is stirred at room temperature for 6 hours, and ethyl acetate (100 mL) is slowly dripped. This solution is slowly poured to dilute aqueous hydrochloric acid/water/ethyl acetate to filter insoluble matter. The organic layer is washed with water and brine, dried over magnesium sulfate, and concentrated under reduced pressure. The residue is purified by column chromatography (developing solvent: ethyl acetate/hexane=1/1) to obtain compound 5 (8.0 g, 14.0 mmol, 1.92%) as viscous oily substance.
(Synthesis of Compound F-1)

Acrylic acid chloride (2.7 mL) is dripped to an acetonitrile (120 mL) solution of compound 5 (5.7 g, 10 mmol) and potassium carbonate (9.0 g) at a temperature of 10° C. or less. After stirring the reaction solution at room temperature for 5 hours, potassium carbonate (8 g) and acrylic acid chloride (2.5 mL) are added and the reaction solution is stirred for further 20 hours. The reaction solution is poured to ethyl acetate (500 mL)/dilute aqueous hydrochloric acid (500 mL) and separated. After washing the organic layer with a sodium bicarbonate aqueous solution and brine, the residue is purified by column chromatography (developing solvent:ethyl acetate/hexane=1/3) to obtain compound F-1 (5.4 g, 74%).
(Synthesis of Polyfunctional Fluorine-containing Polymer (P-1))

Ethyl acetate (40 mL), hydroxylethyl vinyl ether (14.7 g) and dilauroyl peroxide (0.55 g) are charged in a stainless steel autoclave having a capacity of 100 mL equipped with a stirrer, the system is deaerated and replaced with nitrogen gas. Further, hexafluoropropylene (HFP) (25 g) is introduced into the autoclave and the temperature is raised to 65° C. Pressure at the time when the temperature in the autoclave reached 65° C. is 0.53 MPa (5.4 kg/cm$^2$). Reaction is continued for 8 hours while maintaining the same temperature. When pressure reaches 0.31 MPa (3.2 kg/cm$^2$), heating is stopped and allowed to be cooled. When the temperature lowers to room temperature, unreacted monomer is expelled, the autoclave is opened and the reaction solution is taken out. The obtained reaction solution is thrown into a vastly excessive hexane, the solvent is removed by decantation, and the precipitated polymer is taken out. The polymer is dissolved in a small amount of ethyl acetate, and the residual monomer is completely removed by performing reprecipitation two times from hexane. After drying, 28 g of polymer is obtained. In the next place, 20 g of the polymer is dissolved in 100 mL of N,N-dimethylacetamide, 11.4 g of acrylic acid chloride is dripped while cooling with ice, followed by stirring at room temperature for 12 hours. The reaction solution is washed with ethyl acetate, and the organic layer is extracted and concentrated. The obtained polymer is reprecipitated with hexane and 19 g of perfluoroolefin copolymer (P-1) is obtained. The refractive index of the obtained polymer is 1.422, the mass average molecular weight is 40,000, and Mw/Mn is 1.7.
(Low Molecular Weight Binder)

DPHA: Mixture of dipentaerythritol pentaacrylate and dipentaerythritol hexaacrylate (manufactured by Nippon Kayaku Co., Ltd.)

PET-30: Mixture of pentaerythritol triacrylate and pentaerythritol tetraacrylate (manufactured by Nippon Kayaku Co., Ltd.)

TMPTA: Trimethylolpropane triacrylate (manufactured by Toagosei Co., Ltd.)
(Other Compounds)

Irgacure 127: A photo-polymerization initiator (manufactured by Ciba Specialty Chemicals Corp.)

3 µm Crosslinking acryl particles (SSX-103, manufactured by Sekisui Chemical Co., Ltd.)

FP-13: Fluorine-based surface modifier

FP-13: Fluorine-Based Surface Modifier $$-(CH_2-\underset{\underset{O-(CH_2)_2-(CF_2)_6-H}{\overset{\overset{O}{\|}}{C}}}{\overset{CH_3}{C}})_{60}-$$

$$-(CH_2-\underset{\underset{O-t-Bu}{\overset{\overset{O}{\|}}{C}}}{\overset{H}{C}})_{40}-$$

Mw 14000

(Solvents)

MEK: Methyl ethyl ketone

PGMEA: Propylene glycol monomethyl ether acetate

PGM-Ac: Propylene glycol monoethyl ether acetate
[Manufacture of Coating Solution for Low Refractive Index Layer]

Composition of coating solution for low refractive index layer (Ln-1):

| | |
|---|---|
| Fluorine-containing polymer (A-1) containing an ethylenically unsaturated group | 3.9 g |
| Silica dispersion A (solid content concentration: 22% by mass) | 25.0 g |
| Irgacure 127 | 0.2 g |
| DPHA | 0.4 g |
| MEK | 100.0 g |
| MIBK | 45.5 g |

The compounds used above are shown below.
Fluorine-containing polymer (A-1) containing an ethylenically unsaturated group: Fluorine polymer (A-1) disclosed in JP-A-2005-89536, Manufacture Example 3

The above coating solution for low refractive index layer (L-1) is prepared by filtering with a polypropylene filter having a pore diameter of 1 µm. The refractive index after curing of the low refractive index layer obtained by coating and curing the coating solution is 1.360.
(Silica Dispersion A)

After adding and mixing 10 g of acryloyloxypropyl trimethoxysilane (manufactured by Shin-Etsu Chemical Co., Ltd.) and 1.0 g of diisopropoxy aluminum ethyl acetate to/with 500 g of hollow silica sol particles (isopropyl alcohol silica sol, average particle size: 60 nm, shell thickness: 10 nm, silica concentration: 20% by mass, refractive index of silica particles: 1.31, manufactured according to Preparation Example 4 in JP-A-2002-79616 by changing the size), 3 g of ion exchange water is added. After reaction at 60° C. for 8 hours, the temperature is lowered to room temperature, and 1.0 g of acetylacetone is added. The replacement of solvents by distillation under reduced pressure is performed while adding cyclohexanone to 500 g of the dispersion so that the content of silica is substantially constant. Foreign matters do not occur in the dispersion. The viscosity at the time when the solid content concentration is adjusted with cyclohexanone to 22% by mass is 5 mPa·s at 25° C. The residual amount of isopropyl alcohol of the obtained dispersion A analyzed by gas chromatography is 1.0%.

Example 1

[Manufacture of Laminate]
(Formation of Antistatic Layer)

An antistatic layer is formed by coating the above prepared coating solution (A-1) on a triacetyl cellulose film TAC-TD80U (manufactured by Fuji Photo Film Co., Ltd.) having a thickness of 80 μm and width of 1,340 mm by means of a die coater at a conveying rate of 30 m/min. The coated layer is dried at 60° C. for 150 sec. After drying, the coated layer is cured under nitrogen purge (oxygen concentration: 0.01% or less) with an air-cooled metal halide lamp of 160 W/cm (manufactured by Eyegraphics Co., Ltd.) by irradiation with UV ray at illumination intensity of 400 mW/cm$^2$ and irradiation dose of 250 mJ/cm$^2$. The thickness after curing of the antistatic layer is 6 μm.

[Saponification Treatment]

The surface of the antistatic layer of the thus obtained laminate sample is protected by lamination and the reverse is subjected to saponification treatment as follows.

A sodium hydroxide aqueous solution of 1.5 mol/L is prepared and retained at 55° C. An aqueous solution of dilute sulfuric acid of 0.005 mol/L is prepared and retained at 35° C. The manufactured laminate is immersed in the above sodium hydroxide aqueous solution for 2 minutes, and then immersed in water to thoroughly wash away the sodium hydroxide aqueous solution. Subsequently, the laminate is immersed in the above dilute sulfuric acid aqueous solution for 1 minute, and then immersed in water to thoroughly wash away the dilute sulfuric acid aqueous solution. The sample is finally dried at 120° C. for 3 minutes.

[Evaluation of Laminate]

Evaluation and measurement of the following items of the obtained laminates are carried out.

(Evaluation 1) Observation of Three-Dimensional Connection Structure of Conductive Polymer The laminate is obliquely cut with a microtome at an angle of 45°, and the cut cross section of the antistatic layer is analyzed by TOF-SIMS method. It is possible to compute the relative value of local concentration of the conductive polymer by mapping the signal strength resulting from the organic conductive compound all over the area of the cross section of the antistatic layer. By coloring the regions where conductive polymer having local concentration of the electrically conductive polymer of 1.5 times or more than the average value of the entire region of the cross section is present, whether the regions are in contact with each other in the cross section of the antistatic layer is judged. Measurement by TOF-SIMS method is performed with the following apparatus.

Apparatus: TRIFTII, manufactured by Physical Electronics (PHI)

Further, the presence of a sea-island structure is confirmed similarly by TOF-SIMS method.

(Evaluation 2) Evaluation of Abrasion Resistance

Rubbing test is performed with a rubbing tester on the following condition.

Evaluation environment: 25° C., 60% RH

Rubbing material: Steel wool (No. 0000, manufactured by Nihon Steel Wool Co., Ltd.) is wound around the rubbing tip (1 cm×1 cm) of the tester where the tip of the tester is brought into contact with the surface on the antistatic layer side of the laminate sample, and fixed with a band so as not to move. Rubbing movement (going and returning) is carried out on the following condition.

Distance of movement (one way): 13 cm, rubbing speed: 13 cm/sec

Load: 500 g/cm$^2$, contact area of the tip: 1 cm×1 cm

Number of times of rubbing: Ten times of going and returning

Oily black ink is painted on the reverse side of the sample after rubbing. The abrasion of the rubbed part is visually observed by the reflected light, and evaluated according to the following criteria.

A: Abrasion is not seen at all even by very careful observation.
B: A slight abrasion is faintly seen by very careful observation.
C: A slight abrasion is seen.
D: Abrasion can be seen at a glance.
A and B are practicable levels.

(Evaluation 3) Evaluation of Adhesion

A laminate sample is humidity conditioned at 25° C. 60% RH for 2 hours. The surface on the antistatic layer side of each sample is cut with a cutter knife like checkers lengthwise and breadthways respectively with 11 cut lines to make 100 squares in total. A polyester adhesive tape (No. 31B, manufactured by Nitto Denko Corporation) is adhered to the surface. After the lapse of 30 minutes, the tape is peeled quickly in the vertical direction. The number of the squares peeled is counted and evaluated according to the following four criteria. The same adhesion evaluation is carried out 3 times and the results are averaged.

A: Peeling is not observed in all of 100 squares.
B: Peeling of 1 or 2 squares is observed in 100 squares.
C: Peeling of 3 to 10 squares is observed in 100 squares (allowable range).
D: Peeling of 11 or more squares is observed in 100 squares (Evaluation 4) Measurement of Surface Resistance Value The surface resistance of the surface on the antistatic layer side is measured with ultra-insulation resistance/micro-amperemeter TR 8601 (manufactured by Advantest Corporation) on the condition of 25° C. 60% RH. The results are shown as the common logarithmic value (Log SR) of the surface resistivity.

When the laminate has further another layer as the uppermost layer of the antistatic layer, surface resistance is measured from another layer side (on the opposite to the base material).

(Evaluation 5) Evaluation of Dustproof

The transparent support side of each laminate sample is adhered on the CRT surface. The sample is used in a room having 1,000,000 to 2,000,000 dusts and tissue paper dusts having a size of 0.5 μm or more per ft$^3$ (cubic feet). The number of dusts and tissue paper dusts adhered per 100 cm$^2$ of the laminate is measured. The average value of each result is evaluated according to the following four criteria.

A: Less than 20
B: 20 to 49
C: 50 to 199
D: 200 or more

The level B or more is applicable.
(Evaluation 6) Visual Evaluation of Optical Surface State The laminate sample is subjected to the tests of (1) transmission surface test under a three band fluorescent lamp, and (2) oily black ink is painted on the side reverse to the side having the antistatic layer, and reflection surface test is performed under a three band fluorescent lamp. The uniformity of the surface (free from unevenness due to wind, drying unevenness, coating streak and the like) is evaluated in detail.
D: Surface is inferior
C: Under the aim
B: Considerably good
A: Extremely good The results obtained are shown in Table 3 below.

Sharp Corporation) are peeled. The above prepared polarizing plate is adhered in place in a manner that the transmission axis coincides with the polarizing plate adhered to the above liquid crystal display, and a liquid crystal display having each of laminate samples 101 to 119 is manufactured. The laminate samples 101 to 119 are adhered on the visible side of the display.

Example 3

A low refractive index layer is laminated on the antistatic layer of each of samples 101 to 119, and a liquid crystal display is manufactured in the same manner as in Example 2.

TABLE 3

| | | | | Performances | | | | | | |
|---|---|---|---|---|---|---|---|---|---|---|
| Sample No. | Coating Composition | Film Thickness (μm) | Surface Resistivity Log (SR) | Three-dimensional Connection Structure of Electrically Conductive Polymer | Sea-Island Structure of Electrically Conductive Polymer | Abrasion Resistance | Adhering Property | Dustproof Property | Optical Plane | Remarks |
| 101 | A-1 | 6 | 14 | Absent | Absent | B | B | C | C | Comparative Example |
| 102 | A-2 | 6 | 13 | Absent | Absent | D | D | B | C | Comparative Example |
| 103 | A-3 | 6 | 12 | Absent | Absent | D | D | B | D | Comparative Example |
| 104 | A-4 | 6 | 12.5 | Present | Absent | B | B | B | B | Invention |
| 105 | A-5 | 10 | 12 | Present | Absent | B | B | B | B | Invention |
| 106 | A-6 | 6 | 9 | Present | Present | B | B | A | B | Invention |
| 107 | A-7 | 6 | 11 | Present | Present | B | B | B | A | Invention |
| 108 | A-8 | 8 | 10 | Present | Present | B | B | A | A | Invention |
| 109 | A-9 | 6 | 8 | Present | Present | A | A | A | A | Invention |
| 110 | A-10 | 10 | 9 | Present | Present | A | A | A | A | Invention |
| 111 | A-11 | 10 | 9 | Present | Present | A | A | A | A | Invention |
| 112 | A-12 | 8 | 8 | Present | Present | A | A | A | A | Invention |
| 113 | A-13 | 6 | 9 | Present | Present | A | A | A | A | Invention |
| 114 | A-14 | 6 | 9 | Present | Present | A | A | A | A | Invention |
| 115 | A-15 | 6 | 11 | Present | Present | B | B | B | B | Invention |
| 116 | A-16 | 6 | 8 | Present | Present | A | A | A | A | Invention |
| 117 | A-17 | 6 | 10 | Present | Present | A | A | B | B | Invention |
| 118 | A-18 | 6 | 12 | Present | Present | B | B | B | B | Invention |
| 119 | A-19 | 6 | 11 | Present | Present | B | B | B | B | Invention |

As shown in Table 3, even when the use amount of the conductive polymer is the same, a three-dimensional connection structure of the conductive polymer is not present in Samples 101 to 103. On the other hand, the laminates in the invention having a three-dimensional connection structure (Samples 104 to 119) are low in surface resistivity (antistatic property is improved), excellent in dustproof property, have excellent surface state free from streak and unevenness, and exhibit good abrasion resistance and adhesion property.

Example 2

[Evaluation by Liquid Crystal Display]
(Manufacture of Polarizing Plate)

A polarizer is manufactured by the adsorption of iodine to polyvinyl alcohol and stretching. Both surfaces of the polarizer are adhered to a triacetyl cellulose film TAC-TD80U (manufactured by Fuji Photo Film Co., Ltd.) having a thickness of 80 μm immersed in an NaOH aqueous solution of 1.5 mol/L at 55° C. for 2 minutes, neutralized and washed, and laminate samples 101 to 119 (having been subjected to saponification treatment) and protected, thus a polarizing plate is manufactured.
(Manufacture of Liquid Crystal Display)

The polarizing plate and phase difference film provided on VA type liquid crystal display (LC-37GS10, manufactured by (Formation of Low Refractive Index Layer)

The above coating solution (Ln-1) for low refractive index layer is adjusted so that the thickness of the low refractive index layer becomes 95 nm and coated on the antistatic layer of each of samples 101 to 119 by a micro gravure coat method and cured on the following condition to form a low refractive index layer.

Curing conditions in the formation of the low refractive index layer are shown below.
(1) Drying: 80° C., 120 sec
(2) Heat treatment before irradiation: 95° C., 5 min
(3) UV curing: 90° C., 1 min: The coated layer is cured under nitrogen purge so that oxygen concentration becomes 0.01% by vol. or less with an air-cooled metal halide lamp of 240 W/cm (manufactured by Eyegraphics Co., Ltd.) by irradiation at illumination intensity of 120 mW/cm$^2$ and irradiation dose of 240 mJ/cm$^2$.
(4) Heat treatment after irradiation: 30° C., 5 min Each of the thus manufactured polarizing plate with a laminate and image display device of the invention exhibits excellent surface state free from streaks and unevenness, high abrasion resistance, excellent dustproof property and adhesion, similarly to the laminate adhered, as compared with comparative examples. Further, the samples of the invention having a low refractive index layer show the surface resistance value of almost the same with the case not having a low refractive index layer (Log SR is 0.5 or less), and exhibit good surface state, dustproof property and adhesion. A background is hardly reflected, therefore, liquid crystal displays having very high display quality can be obtained according to the invention.

While the present invention has been shown and described with reference to certain exemplary embodiments thereof, it will be understood by those skilled in the art that various changes modifications may be made therein without departing from the spirit and scope of the present invention as defined by the appended claims.

What is claimed is:

1. A laminate comprising:
a support; and
an antistatic layer,
wherein the antistatic layer is provided on the support and comprises at least (A) an electrically conductive polymer, and (B) a binder component,
the antistatic layer has regions having local concentration of the electrically conductive polymer (A) of 1.5 times or more higher than the average value of the concentration of the electrically conductive polymer (A) in the antistatic layer and the regions are in contact with each other to form a three-dimensional connection structure in the antistatic layer, and
a common logarithmic value of the surface resistivity of which unit is Ω/sq of the antistatic layer is 3.0 or more and 13.0 or less,
wherein the binder component (B) comprises a binder component (B1) having a number average molecular weight of greater than or equal to 1,500 and less than 500,000 and selected from the group consisting of styrene resins, (meth)acrylic resins, vinyl ester resins, vinyl ether resins, halogen-containing resins, alicyclic olefin resins, polycarbonate resins, polyester resins, polyamide resins, cellulose derivatives, silicone resins, and rubbers or elastomers, and
wherein the binder component (B) comprises a binder component (B2) having a molecular weight of greater than or equal to 200 and less than 1,500 and comprising a polyfunctional monomer having three or more (meth)acryloyl groups in one molecule.

2. A laminate comprising:
a support; and
an antistatic layer,
wherein the antistatic layer is provided on the support and comprises at least (A) an electrically conductive polymer, and (B) a binder component,
the antistatic layer has a sea-island structure containing the electrically conductive polymer (A) in a sea part, and
a common logarithmic value of the surface resistivity of which unit is Ω/sq of the antistatic layer is 3.0 or more and 13.0 or less,
wherein the binder component (B) comprises a binder component (B1) having a number average molecular weight of greater than or equal to 1,500 and less than 500,000 and selected from the group consisting of styrene resins, (meth)acrylic resins, vinyl ester resins, vinyl ether resins, halogen-containing resins, alicyclic olefin resins, polycarbonate resins, polyester resins, polyamide resins, cellulose derivatives, silicone resins, and rubbers or elastomers, and
wherein the binder component (B) comprises a binder component (B2) having a molecular weight of greater than or equal to 200 and less than 1,500 and comprising a polyfunctional monomer having three or more (meth)acryloyl groups in one molecule.

3. The laminate according to claim 1,
wherein the binder component (B) comprises a repeating unit having a crosslinking part, and
the crosslinking part is at least one selected from the group consisting of a hydroxyl group, a silyl group having a hydrolyzable group, a group having a reactive unsaturated double bond, a ring opening polymerization reactive group, a group having an active hydrogen atom, a group capable of substitution with a nucleophilic agent, and an acid anhydride.

4. The laminate according to claim 1,
wherein the electrically conductive polymer (A) is a π conjugated electrically conductive polymer or a derivative thereof.

5. The laminate according to claim 4,
wherein the π conjugated electrically conductive polymer is at least one selected from the group consisting of a polythiophene, a polyaniline, a polythiophene derivative and a polyaniline derivative.

6. The laminate according to claim 1,
wherein the electrically conductive polymer (A) is a cationic electrically conductive polymer.

7. The laminate according to claim 1,
wherein the antistatic layer is formed with a composition having at least one solvent of the electrically conductive polymer (A) and at least one solvent of the binder (B).

8. An optical film comprising: a laminate, said laminate comprising:
a support; and
an antistatic layer,
wherein the antistatic layer is provided on the support and is made with a composition comprising at least (A) an electrically conductive polymer, and (B) a binder component,
the antistatic layer has regions having local concentration of the electrically conductive polymer (A) of 1.5 times or more higher than the average value of the concentration of the electrically conductive polymer (A) in the antistatic layer and the regions are in contact with each other to form a three-dimensional connection structure in the antistatic layer, and
a common logarithmic value of the surface resistivity of which unit is Ω/sq of the antistatic layer is 3.0 or more and 13.0 or less,
wherein the binder component (B) comprises a binder component (B1) having a number average molecular weight of greater than or equal to 1,500 and less than 500,000 and selected from the group consisting of styrene resins, (meth)acrylic resins, vinyl ester resins, vinyl ether resins, halogen-containing resins, alicyclic olefin resins, polycarbonate resins, polyester resins, polyamide resins, cellulose derivatives, silicone resins, and rubbers or elastomers, and
wherein the binder component (B) comprises a binder component (B2) having a molecular weight of greater than or equal to 200 and less than 1,500 and comprising a polyfunctional monomer having three or more (meth)acryloyl groups in one molecule.

9. A polarizing plate comprising:
a polarizing film; and
at least one protective film on the polarizing film,
wherein the at least one protective film is a laminate,
wherein the laminate comprises:
a support; and
an antistatic layer, wherein the antistatic layer is provided on the support and is made with a composition comprising at least (A) an electrically conductive polymer, and (B) a binder component, the antistatic layer has regions having local concentration of the electrically conductive polymer (A) of 1.5 times or more higher than the average value of the concentration of the electrically conductive polymer (A) in the antistatic layer and the regions are in contact with each other to form a three-dimensional connection structure in the antistatic layer, and a common logarithmic value of the surface resistivity of which unit is Ω/sq of the antistatic layer is 3.0 or more and 13.0 or less, wherein the binder component (B) comprises a binder component (B1) having a number average molecular weight of greater than or equal to 1,500 and less than 500,000 and selected from the group consisting of styrene resins, (meth)acrylic resins, vinyl ester resins, vinyl ether resins, halogen-containing resins, alicyclic olefin resins, polycarbonate resins, polyester resins, polyamide resins, cellulose derivatives, silicone resins, and rubbers or elastomers, and wherein the binder component (B) comprises a binder component (B2) having a molecular weight of greater than or equal to 200 and less than 1,500 and comprising a polyfunctional monomer having three or more (meth)acryloyl groups in one molecule.

10. An image display device comprising an optical film including a laminate or protective film of a polarizing film of a polarizing plate, said laminate comprising:
a support; and
an antistatic layer,
wherein the antistatic layer is provided on the support and is made with a composition comprising at least (A) an electrically conductive polymer, and (B) a binder component, the antistatic layer has regions having local concentration of the electrically conductive polymer (A) of 1.5 times or more higher than the average value of the concentration of the electrically conductive polymer (A) in the antistatic layer and the regions are in contact with each other to form a three-dimensional connection structure in the antistatic layer, and a common logarithmic value of the surface resistivity of which unit is Ω/sq of the antistatic layer is 3.0 or more and 13.0 or less, wherein the binder component (B) comprises a binder component (B1) having a number average molecular weight of greater than or equal to 1,500 and less than 500,000 and selected from the group consisting of styrene resins, (meth)acrylic resins, vinyl ester resins, vinyl ether resins, halogen-containing resins, alicyclic olefin resins, polycarbonate resins, polyester resins, polyamide resins, cellulose derivatives, silicone resins, and rubbers or elastomers, and wherein the binder component (B) comprises a binder component (B2) having a molecular weight of greater than or equal to 200 and less than 1,500 and comprising a polyfunctional monomer having three or more (meth)acryloyl groups in one molecule.

11. A laminate comprising a layer on an upper layer of the antistatic layer of the laminate according to claim 1,
wherein a common logarithmic value of the surface resistivity of which unit is Ω/sq of an outermost layer of the laminate is 3.0 or more and 13.0 or less.

* * * * *